US012472935B2

(12) United States Patent
Nakashima et al.

(10) Patent No.: US 12,472,935 B2
(45) Date of Patent: Nov. 18, 2025

(54) CONTROL DEVICE, CONTROL METHOD, AND COMPUTER-READABLE RECORDING MEDIUM

(71) Applicant: HONDA MOTOR CO., LTD., Tokyo (JP)

(72) Inventors: Hiroyuki Nakashima, Tokyo (JP); Tatsuro Fujiwara, Tokyo (JP); Akiko Sato, Tokyo (JP); Mizuki Owada, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 322 days.

(21) Appl. No.: 18/112,765

(22) Filed: Feb. 22, 2023

(65) Prior Publication Data

US 2023/0286495 A1 Sep. 14, 2023

(30) Foreign Application Priority Data

Mar. 14, 2022 (JP) ................................. 2022-039043
Aug. 31, 2022 (JP) ................................. 2022-137842

(51) Int. Cl.
*B60W 30/06* (2006.01)
*B60W 50/14* (2020.01)

(52) U.S. Cl.
CPC ............ *B60W 30/06* (2013.01); *B60W 50/14* (2013.01); *B60W 2050/146* (2013.01); *B60W 2554/20* (2020.02); *B60W 2556/10* (2020.02)

(58) Field of Classification Search
CPC ................. B60W 30/06; B60W 50/14; B60W 2050/146; B60W 2554/20; B60W 2556/10; B62D 15/0285
See application file for complete search history.

(56) References Cited

U.S. PATENT DOCUMENTS

2007/0146165 A1* 6/2007 Tanaka ............... B62D 15/0285 348/148
2015/0109118 A1 4/2015 Urano et al.
2016/0355180 A1 12/2016 Urano et al.
2018/0018878 A1 1/2018 Kitano
2018/0029594 A1 2/2018 Urano et al.
2018/0244287 A1* 8/2018 Kirstein ................ G06F 3/0482
(Continued)

FOREIGN PATENT DOCUMENTS

JP 2008-213647 A 9/2008
JP WO2013/168246 A1 11/2013
(Continued)

OTHER PUBLICATIONS

May 14, 2024, Translation of Japanese Office Action issued for related JP Application No. 2022-137842.

*Primary Examiner* — Ian Jen
*Assistant Examiner* — Renee LaRose
(74) *Attorney, Agent, or Firm* — Paratus Law Group, PLLC

(57) ABSTRACT

A control device for a moving body includes: a receiver configured to receive designation of an obstacle position from a user of the moving body; and a controller configured to perform parking control for parking the moving body at a target parking position based on an obstacle position designated by the user. The controller is configured to register the obstacle position as a designated obstacle position in association with the target parking position.

14 Claims, 20 Drawing Sheets

(56) References Cited

U.S. PATENT DOCUMENTS

| | | | | |
|---|---|---|---|---|
| 2019/0027041 | A1* | 1/2019 | Watanabe | G06V 20/58 |
| 2021/0300341 | A1* | 9/2021 | Shoda | G06V 20/586 |

FOREIGN PATENT DOCUMENTS

| | | | |
|---|---|---|---|
| JP | WO2016/117060 | A1 | 7/2016 |
| JP | 2018-525266 | A | 9/2018 |
| WO | WO 2017/028849 | A1 | 2/2017 |

* cited by examiner (FIG. 3 CONTINUED)
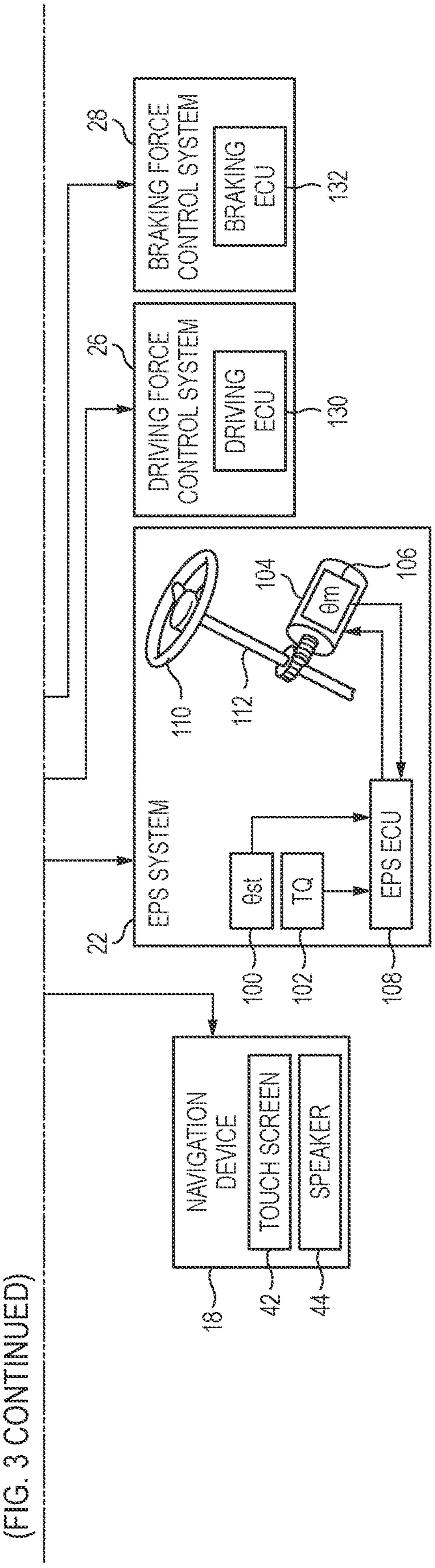

(FIG. 4 CONTINUED)
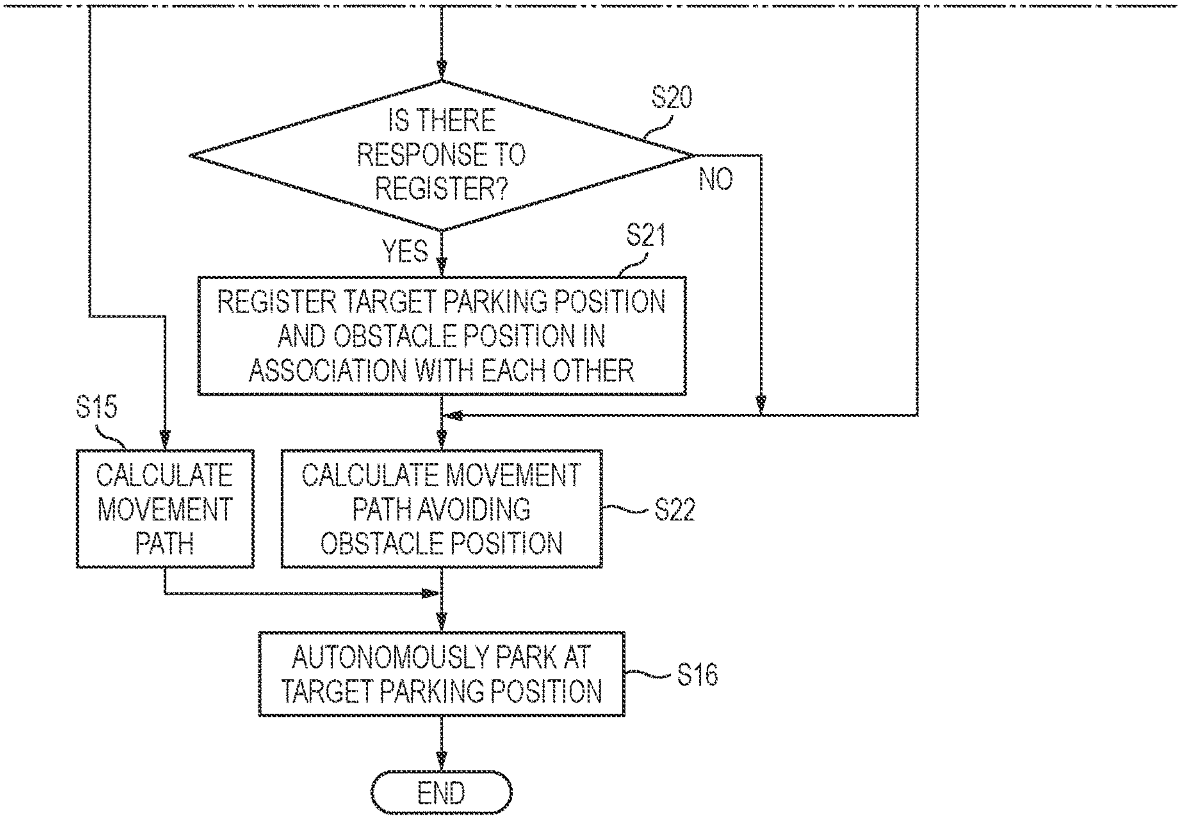

(FIG. 12 CONTINUED)
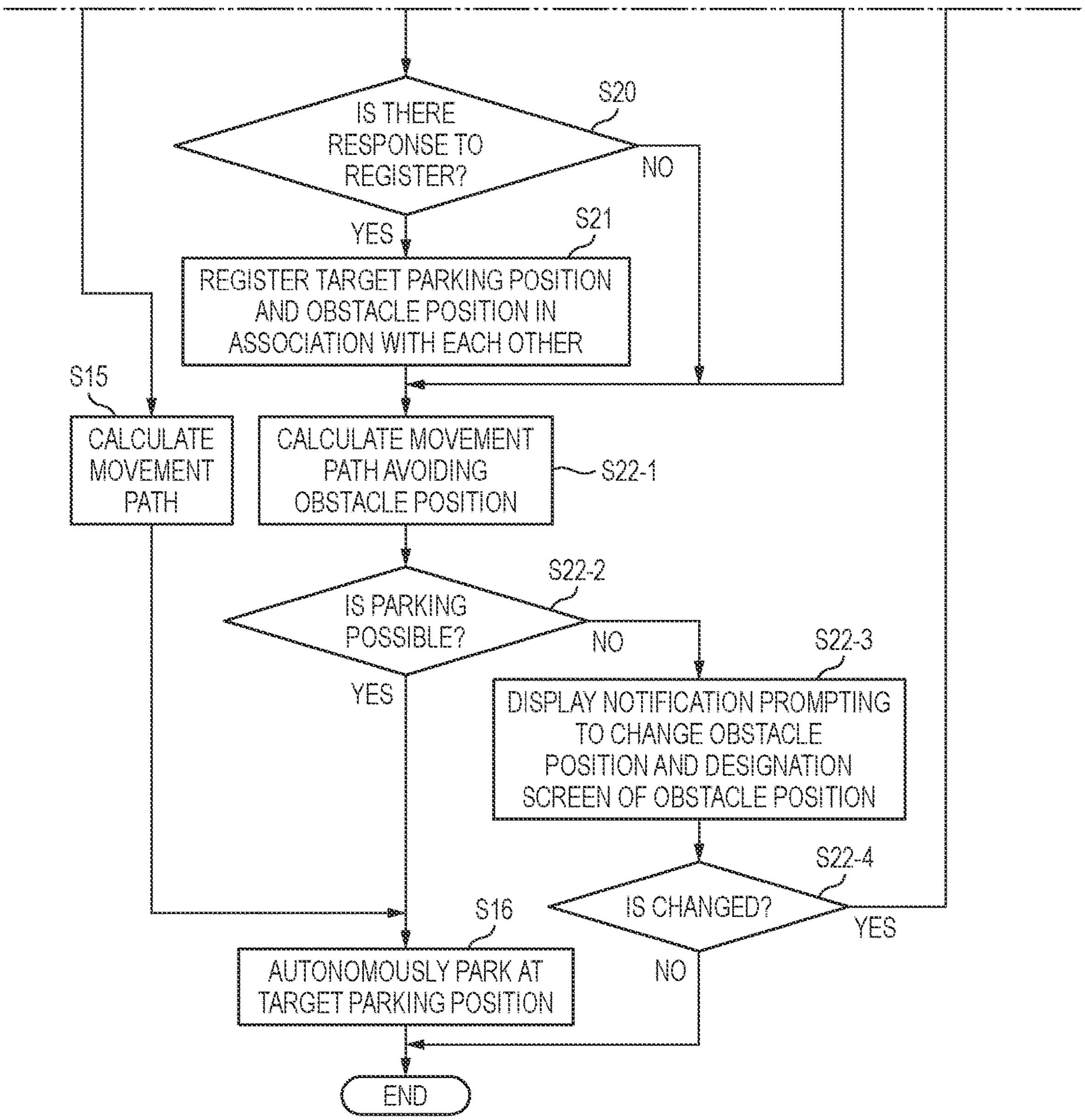

CONTROL DEVICE, CONTROL METHOD, AND COMPUTER-READABLE RECORDING MEDIUM

CROSS-REFERENCE TO RELATED APPLICATIONS

This application is based on and claims priority under 35 USC 119 from Japanese Patent Application No. 2022-039043 filed on Mar. 14, 2022 and Japanese Patent Application No. 2022-137842 filed on Aug. 31, 2022, the contents of which are incorporated herein by reference.

TECHNICAL FIELD

The present disclosure relates to a control device, a control method, and a computer-readable recording medium.

BACKGROUND

In recent years, efforts have been actively made to provide access to sustainable transportation systems that are considerate of vulnerable people in transport participants. In order to realize the above-described goal, attention is focused on research and development to further improve safety and convenience of traffic through research and development related to a driving assistance technology.

The related art discloses autonomous parking control for autonomously moving and parking a vehicle in a designated predetermined parking space. International Patent Publication No. WO2017/028849 pamphlet (hereinafter, referred to as Patent Literature 1) discloses that an obstacle can be added to and deleted from, by a manual operation input, an autonomous parking trajectory determined in advance, and the autonomous parking trajectory adjusted by a manual operation is determined to park a vehicle.

According to Patent Literature 1, when a user recognizes an obstacle that cannot be detected by a sensor or the like, it is possible to calculate an autonomous parking trajectory in consideration of the obstacle that can be added by a manual operation input.

However, even in a case where a vehicle is parked at the same parking position, such as a home parking lot or a monthly parking lot, it is necessary to manually input the same obstacle each time, which may be a burden for a user. Therefore, in the driving assistance technology, there is room for improvement in the related art in this respect.

The present disclosure provides a control device, a control method, and a computer-readable recording medium storing a control program which enable to reduce a burden on a user when a vehicle is parked at a predetermined parking position. Further, the present disclosure contributes to development of sustainable transportation systems.

SUMMARY

A first aspect of the present disclosure relates to a control device for a moving body, the control device including:

- a receiver configured to receive designation of an obstacle position from a user of the moving body; and
- a controller configured to perform parking control for parking the moving body at a target parking position based on an obstacle position designated by the user, in which
- the controller is configured to register the obstacle position as a designated obstacle position in association with the target parking position.

A second aspect of the present disclosure relates to a control method executed by a control device for a moving body, including:

- receiving designation of an obstacle position from a user of the moving body;
- performing parking control for parking the moving body at a target parking position based on an obstacle position designated by the user; and
- registering the obstacle position as a designated obstacle position in association with the target parking position.

A third aspect of the present disclosure relates to a non-transitory computer-readable recording medium storing a control program for causing a processor of a control device for a moving body to execute processing, the processing including:

- receiving designation of an obstacle position from a user of the moving body;
- performing parking control for parking the moving body at a target parking position based on an obstacle position designated by the user; and
- registering the obstacle position as a designated obstacle position in association with the target parking position.

According to the control device, the control method, and the computer-readable recording medium storing a control program in the present disclosure, it is possible to reduce a burden on a user when a vehicle is parked at a predetermined parking position.

BRIEF DESCRIPTION OF DRAWINGS

Exemplary embodiment(s) of the present invention will be described in detail based on the following figures, wherein.

DESCRIPTION OF EMBODIMENTS

Figure 1:
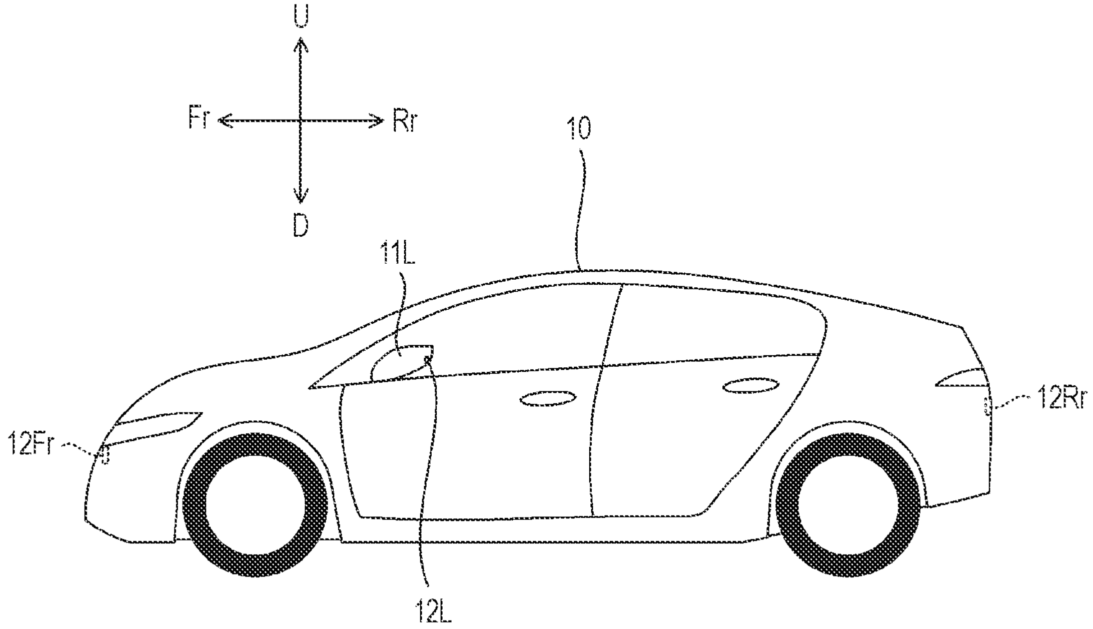
FIG. 1 is a side view showing an example of a vehicle on which a control device according to an embodiment is mounted.

Hereinafter, an embodiment of a control device, a control method, and a computer-readable recording medium control program according to the present disclosure will be described with reference to the accompanying drawings. The drawings are viewed in directions of reference numerals. In addition, in the present specification and the like, in order to simplify and clarify the description, a front-rear direction, a left-right direction, and an upper-lower direction are described according to directions viewed from a driver of a vehicle 10 shown in FIGS. 1 and 2. In the drawings, a front side of the vehicle 10 is denoted by Fr, a rear side thereof is denoted by Rr, a left side thereof is denoted by L, a right side thereof is denoted by R, an upper side thereof is denoted by U, and a lower side thereof is denoted by D.

<Vehicle 10 on which Control Device of Present Disclosure is Mounted>

Figure 2:
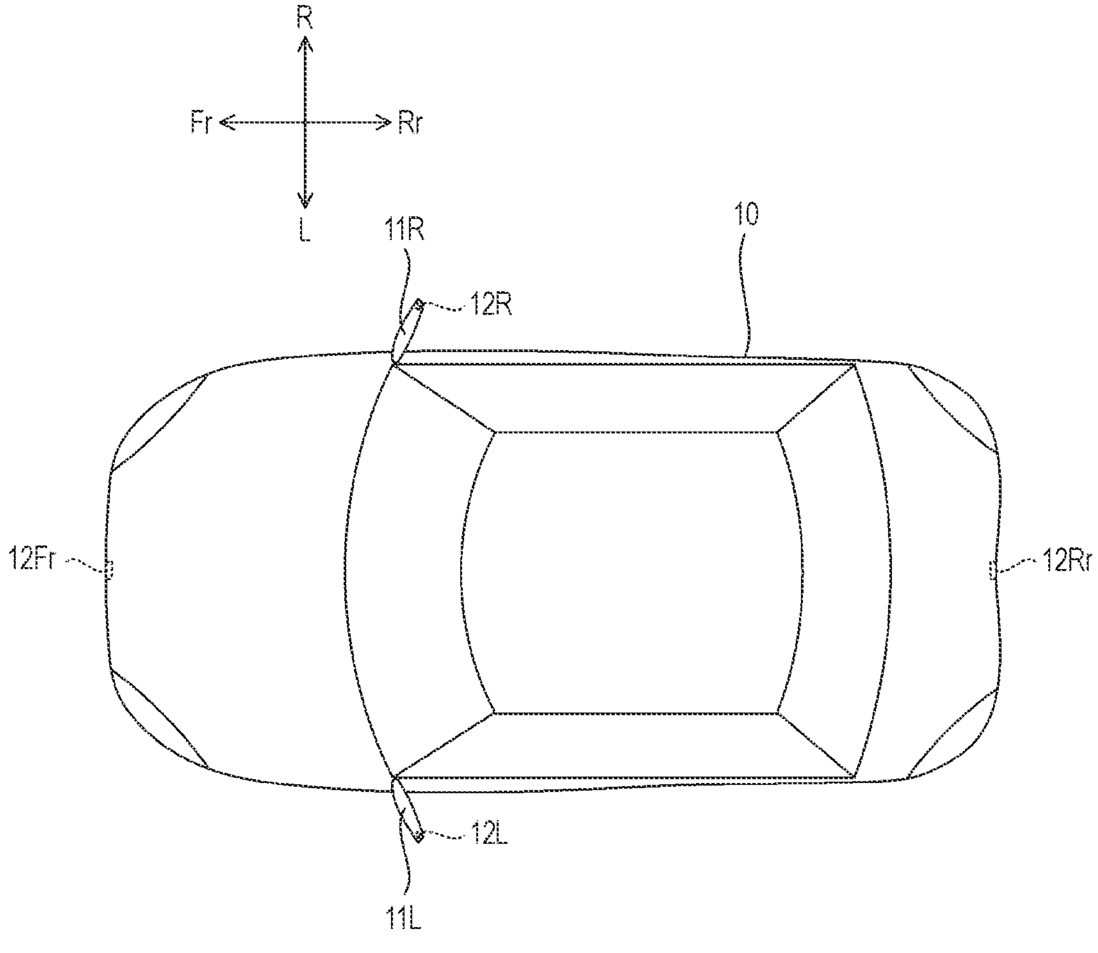
FIG. 2 is a top view of the vehicle shown in FIG. 1.

FIG. 1 is a side view of the vehicle 10 on which a control device according to the present disclosure is mounted. FIG. 2 is a top view of the vehicle 10 shown in FIG. 1. The vehicle 10 is an example of a moving body in the present disclosure.

The vehicle 10 is an automobile including a drive source (not shown) and wheels including driving wheels driven by power of the drive source and steering wheels that are steerable. In the present embodiment, the vehicle 10 is a four-wheeled automobile including a pair of left and right front wheels and a pair of left and right rear wheels. The drive source of the vehicle 10 is, for example, an electric motor. The drive source of the vehicle 10 may be an internal combustion engine such as a gasoline engine or a diesel engine, or a combination of an electric motor and an internal combustion engine. In addition, the drive source of the vehicle 10 may drive the pair of left and right front wheels, the pair of left and right rear wheels, or four wheels, that is, the pair of left and right front wheels and the pair of left and right rear wheels. The front wheels and the rear wheels may both be steering wheels that are steerable, or the front wheels or the rear wheels may be steering wheels that are steerable.

The vehicle 10 further includes side mirrors 11L and 11R. The side mirrors 11L and 11R are mirrors (rearview mirrors) that are provided at outer sides of front seat doors of the vehicle 10 and that allow the driver to check a rear side and rear lateral sides. Each of the side mirrors 11L and 11R is fixed to a body of the vehicle 10 by a rotation shaft extending in a vertical direction and can be opened and closed by rotating about the rotation shaft.

The vehicle 10 further includes a front camera 12Fr, a rear camera 12Rr, a left side camera 12L, and a right side camera 12R. The front camera 12Fr is a digital camera that is provided at a front portion of the vehicle 10 and captures an image of a front side with respect to the vehicle 10. The rear camera 12Rr is a digital camera that is provided at a rear portion of the vehicle 10 and captures an image of a rear side with respect to the vehicle 10. The left side camera 12L is a digital camera that is provided on the left side mirror 11L of the vehicle 10 and captures an image of a left side with respect to the vehicle 10. The right side camera 12R is a digital camera that is provided on the right side mirror 11R of the vehicle 10 and captures an image of a right side with respect to the vehicle 10.

<Internal Configuration of Vehicle 10>

Figure 3:
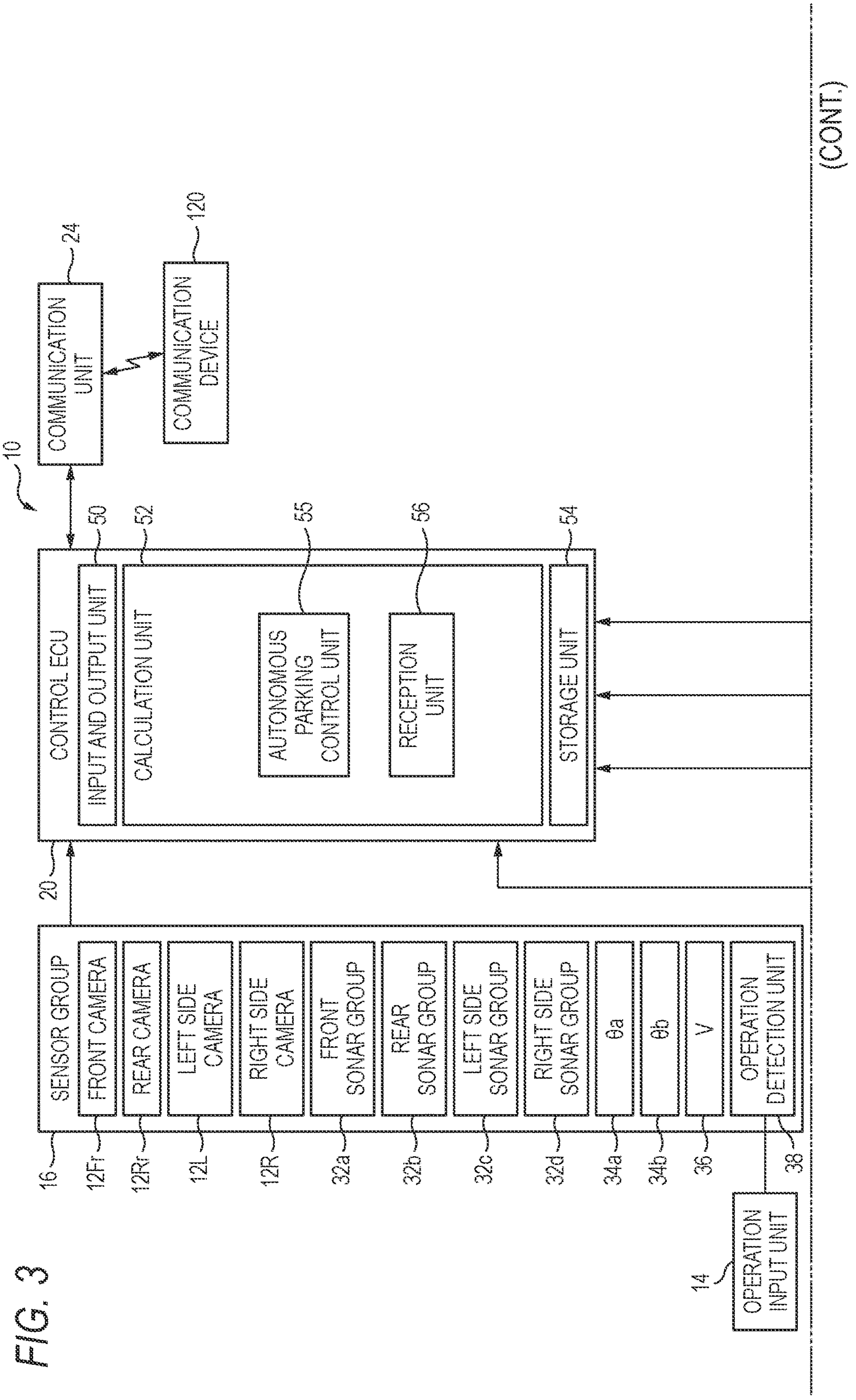
FIG. 3 is a block diagram showing an internal configuration of the vehicle shown in FIG. 1.

FIG. 3 is a block diagram showing an example of an internal configuration of the vehicle 10 shown in FIG. 1. As shown in FIG. 3, the vehicle 10 includes a sensor group 16, a navigation device 18, a control electronic control unit (ECU) 20, an electric power steering (EPS) system 22, and a communication unit 24. The vehicle 10 further includes a driving force control system 26 and a braking force control system 28.

The sensor group 16 acquires various detection values used for control performed by the control ECU 20. The sensor group 16 includes the front camera 12Fr, the rear camera 12Rr, the left side camera 12L, and the right side camera 12R. The sensor group 16 includes a front sonar group 32*a*, a rear sonar group 32*b*, a left side sonar group 32*c*, and a right side sonar group 32*d*. The sensor group 16 includes wheel sensors 34*a* and 34*b*, a vehicle speed sensor 36, and an operation detection unit 38.

The front camera 12Fr, the rear camera 12Rr, the left side camera 12L, and the right side camera 12R acquire recognition data (for example, a peripheral image) for recognizing an external environment of the vehicle 10 by capturing images of a periphery of the vehicle 10. Peripheral images captured by the front camera 12Fr, the rear camera 12Rr, the left side camera 12L, and the right side camera 12R are referred to as a front image, a rear image, a left side image, and a right side image, respectively. An image formed by the left side image and the right side image may be referred to as a side image. An external environment recognition image generated by synthesizing respective pieces of imaging data of the front camera 12Fr, the rear camera 12Rr, the left side camera 12L, and the right side camera 12R may be referred to as a top view image of the vehicle 10.

The front sonar group 32*a*, the rear sonar group 32*b*, the left side sonar group 32*c*, and the right side sonar group 32*d* emit sound waves to the periphery of the vehicle 10 and receive reflected sounds from other objects. The front sonar group 32*a* includes, for example, four sonars. The sonars constituting the front sonar group 32*a* are provided on an obliquely left front side, a front left side, a front right side, and an obliquely right front side of the vehicle 10, respectively. The rear sonar group 32*b* includes, for example, four sonars. The sonars constituting the rear sonar group 32*b* are provided on an obliquely left rear side, a rear left side, a rear right side, and an obliquely right rear side of the vehicle 10, respectively. The left side sonar group 32*c* includes, for example, two sonars. The sonars constituting the left side sonar group 32*c* are provided on a front side and a rear side of a left side portion of the vehicle 10, respectively. The right side sonar group 32*d* includes, for example, two sonars. The sonars constituting the right side sonar group 32*d* are provided on a front side and a rear side of a right side portion of the vehicle 10, respectively.

The wheel sensors 34*a* and 34*b* detect a rotation angle of the wheel of the vehicle 10. The wheel sensors 34*a* and 34*b* may be implemented by angle sensors or displacement sensors. The wheel sensors 34*a* and 34*b* output detection pulses each time the wheel rotates by a predetermined angle. The detection pulses output from the wheel sensors 34*a* and 34*b* are used to calculate the rotation angle of the wheel and a rotation speed of the wheel. A movement distance of the vehicle 10 is calculated based on the rotation angle of the wheel. The wheel sensor 34*a* detects, for example, a rotation angle θa of the left rear wheel. The wheel sensor 34*b* detects, for example, a rotation angle θb of the right rear wheel.

The vehicle speed sensor 36 detects a speed of a vehicle body of the vehicle 10, that is, a vehicle speed V, and outputs the detected vehicle speed V to the control ECU 20. The vehicle speed sensor 36 detects the vehicle speed V based on, for example, rotation of a countershaft of a transmission.

The operation detection unit 38 detects a content of an operation performed by a user using an operation input unit 14 and outputs the detected content of the operation to the control ECU 20. The operation input unit 14 includes, for example, various user interfaces such as a side mirror switch for switching between an opened state and a closed state of the side mirrors 11L and 11R, and a shift lever (a select lever or a selector).

The navigation device 18 detects a current position of the vehicle 10 by using, for example, a global positioning system (GPS), and guides the user to a path to a destination. The navigation device 18 includes a storage device (not shown) that includes a map information database.

The navigation device 18 includes a touch panel 42 and a speaker 44. The touch panel 42 functions as an input device and a display device of the control ECU 20. The speaker 44 outputs various types of guidance information to an occupant of the vehicle 10 by voice.

The touch panel 42 is configured to input various commands to the control ECU 20. For example, the user can input a command related to parking assistance of the vehicle 10 via the touch panel 42. The touch panel 42 is configured to display various screens related to a control content of the control ECU 20. For example, a screen related to the parking assistance of the vehicle 10 is displayed on the touch panel 42. Specifically, the touch panel 42 displays a parking assistance button for requesting the parking assistance of the vehicle 10. The parking assistance button includes an autonomous parking button for requesting parking by autonomous steering of the control ECU 20 and a parking guidance button for requesting guidance when parking by an operation of the driver. The touch panel 42 displays the peripheral image for recognizing the external environment of the vehicle 10. Constituent elements other than the touch panel 42, for example, a head-up display (HUD), a smartphone, or a tablet terminal may be used as the input device or the display device.

The "parking" is synonymous with, for example, "parking the moving body". For example, the "parking" is a stop accompanied by getting on and off of an occupant, and excludes a temporary stop due to a traffic signal or the like. The "parking position" is a position at which the moving body is stopped, that is, a position for parking.

The control ECU 20 includes an input and output unit 50, a calculation unit 52, and a storage unit 54. The calculation unit 52 is implemented by, for example, a central processing unit (CPU). The calculation unit 52 performs various types of control by controlling units based on a program stored in the storage unit 54. Further, the calculation unit 52 inputs and outputs a signal from and to units connected to the control ECU 20 via the input and output unit 50.

The calculation unit 52 includes an autonomous parking control unit 55 for controlling autonomous parking of the vehicle 10, and a reception unit 56 that receives designation of an obstacle position from the user. The calculation unit 52 is an example of the control device according to the present disclosure. The autonomous parking control unit 55 is an example of a control unit in the present disclosure.

The autonomous parking control unit 55 performs the parking assistance of the vehicle 10 by autonomous steering in which a steering 110 is autonomously operated under control of the autonomous parking control unit 55. In the assistance of the autonomous steering, an accelerator pedal (not shown), a brake pedal (not shown), and the operation input unit 14 are autonomously operated. The autonomous parking control unit 55 performs guide assistance when the driver manually parks the vehicle 10 by operating the accelerator pedal, the brake pedal, and the operation input unit 14.

For example, based on the recognition data of the external environment of the vehicle 10 acquired by the front camera 12Fr, the rear camera 12Rr, the left side camera 12L, and the right side camera 12R, and a predetermined parking position (hereinafter, also referred to as a "target parking position") designated by the user, the autonomous parking control unit 55 controls autonomous parking for parking the vehicle 10 at the target parking position.

Specifically, the autonomous parking control unit 55 detects feature points related to the target parking position based on the recognition data of the external environment of the vehicle 10 acquired by the front camera 12Fr, the rear camera 12Rr, the left side camera 12L, and the right side camera 12R, and registers the detected feature points in the storage unit 54 as registered feature points. The feature points related to the target parking position include feature points of the target parking position itself, feature points in a periphery of the target parking position, and the like. Examples of the feature points of the target parking position itself include feature points in which a character "parking" is displayed in the target parking position. Examples of the feature points in the periphery of the target parking position include characteristic buildings and obstacles present in the periphery. Based on the recognition data of the external environment of the vehicle 10 and the registered feature points of the target parking position, the autonomous parking control unit 55 controls the autonomous parking for parking the vehicle 10 at the target parking position.

The autonomous parking control unit 55 registers, in the storage unit 54, a position of an object (hereinafter, also referred to as a "designated obstacle position") that is present in the periphery of the target parking position and that is designated as an obstacle by the user in association with the target parking position. The object designated as an obstacle by the user is an object that does not actually become an obstacle for autonomous parking, that is, an object that is not detected as an obstacle by the autonomous parking control unit 55 but that the user desires to include as an obstacle. The object that the user desires to include as an obstacle is, for example, an object that the vehicle 10 is not desired to pass at the time of the autonomous parking. Specifically, the object that the vehicle 10 is not desired to pass is a "puddle", "dust", a "native-grown plant", or the like that is present on a movement path of the autonomous parking of the vehicle 10. Further, the obstacle designated by the user may include, for example, an area that is set around a place where a child is present and that has a radius R2 larger than a range of a radius R1 actually determined not to be an obstacle for the autonomous parking ($R1<R2$). Based on the recognition data of the external environment of the vehicle 10, the registered feature points of the target parking position, and the designated obstacle position, the autonomous parking control unit 55 controls the autonomous parking for parking the vehicle 10 at the target parking position. The registration of the designated obstacle position is held in the storage unit 54 even after current parking control so that the registration can be referred to at the time of next parking control.

The autonomous parking control unit 55 inquires of the user whether to register the designated obstacle position in association with the target parking position, and determines whether to perform the registration according to a response from the user. The autonomous parking control unit 55 registers the designated obstacle position in association with the target parking position according to a parking history of the vehicle 10 at the target parking position without inquiring the user whether to perform the registration. For example, when parking is performed after N times (for example, twice) at the same parking position, or when the Nth (for example, second) parking is performed within a certain period, the autonomous parking control unit 55 performs the registration without inquiring the user. For example, when the target parking position and the designated obstacle position are already registered in association with each other, the autonomous parking control unit 55 does not inquire of the user whether the registration is necessary.

The autonomous parking control unit 55 calculates a movement path of the vehicle 10 to the target parking position based on an obstacle position designated by the user, and performs a notification prompting the user to change the obstacle position according to a calculation result. For example, when the autonomous parking is performed, in a case where a position of an obstacle cannot be avoided, in a case where a degree of risk exceeds a predetermined value if the position of the obstacle is avoided, or the like, the autonomous parking control unit 55 performs a notification prompting the user to change the position of the obstacle. The obstacle designated by the user is an object that does not actually become an obstacle for the autonomous parking as described above, but that the user desires to include as an obstacle. The autonomous parking control unit 55 notifies the user whether a position of the obstacle can be changed.

The reception unit 56 receives designation of an obstacle position representing a position of an obstacle input to the touch panel 42 by an operation of the user. The reception unit 56 displays and notifies the user of candidates for the obstacle position at the target parking position, and receives designation of the obstacle position selected by the user from the candidates for the obstacle position. The candidates for the obstacle position at the target parking position refer to candidates for a position of an object that may be expected to become an obstacle at the target parking position, that is, a position of an obstacle that is uniquely determined based on the target parking position. The reception unit 56 displays and notifies the user of a candidate for the obstacle position selected by the user and a candidate for the obstacle position not selected by the user in the candidates for the obstacle position in different modes (for example, different colors or different transparency levels).

The EPS system 22 includes a steering angle sensor 100, a torque sensor 102, an EPS motor 104, a resolver 106, and an EPS ECU 108. The steering angle sensor 100 detects a steering angle θst of the steering 110. The torque sensor 102 detects a torque TQ applied to the steering 110.

The EPS motor 104 applies a driving force or a reaction force to a steering column 112 connected to the steering 110, thereby enabling assistance of an operation performed by the occupant on the steering 110 and enabling the autonomous steering during the parking assistance. The resolver 106 detects a rotation angle θm of the EPS motor 104. The EPS ECU 108 controls the entire EPS system 22. The EPS ECU 108 includes an input and output unit (not shown), a calculation unit (not shown), and a storage unit (not shown).

The communication unit 24 enables wireless communication with another communication device 120. The other communication device 120 is a base station, a communication device of another vehicle, an information terminal such as a smartphone carried by the occupant of the vehicle 10, or the like.

The driving force control system 26 includes a driving ECU 130. The driving force control system 26 executes driving force control of the vehicle 10. The driving ECU 130 controls a driving force of the vehicle 10 by controlling an engine (not shown) or the like based on an operation performed by the user on the accelerator pedal (not shown).

The braking force control system 28 includes a braking ECU 132. The braking force control system 28 executes braking force control of the vehicle 10. The braking ECU 132 controls a braking force of the vehicle 10 by controlling a brake mechanism (not shown) or the like based on an operation performed by the user on the brake pedal (not shown).

<Autonomous Parking Control Performed by Calculation Unit 52>

Next, an example of autonomous parking control of the vehicle 10 performed by the calculation unit 52 will be described with reference to FIGS. 4 to 11.

Figure 4:
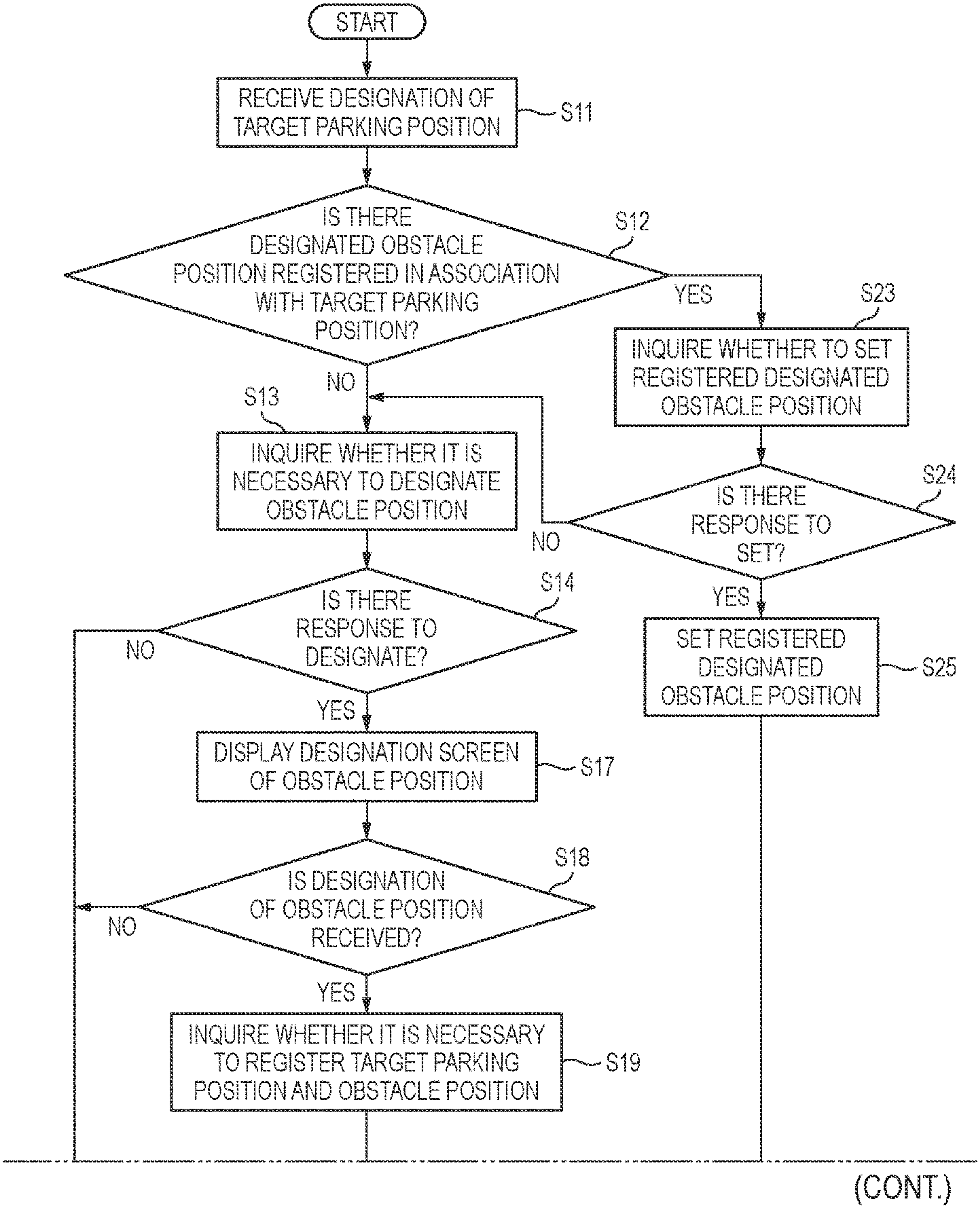
FIG. 4 is a flow chart showing autonomous parking control for parking the vehicle at a target parking position.
Figure 5:
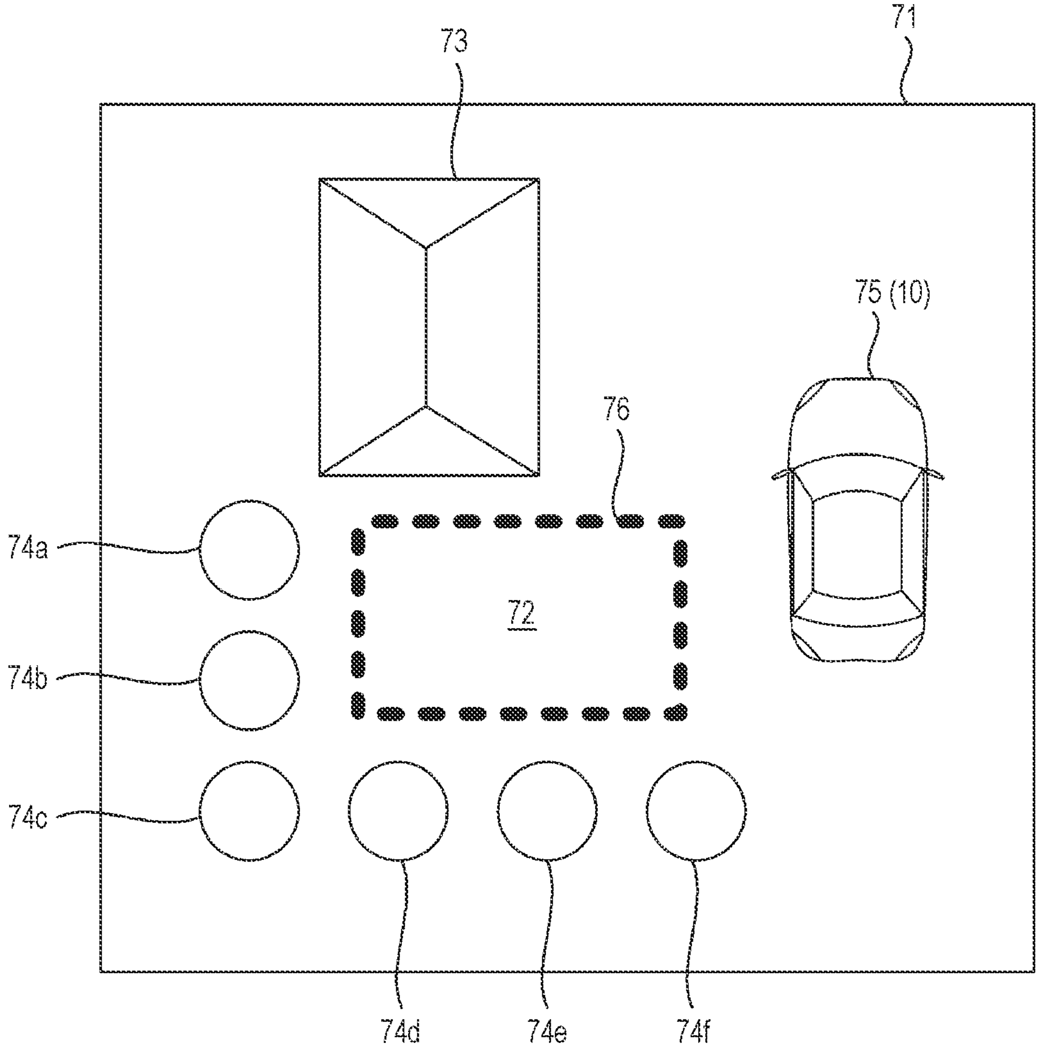
FIG. 5 is a view showing an example of a top view image in which a target parking position is set.
Figure 6:
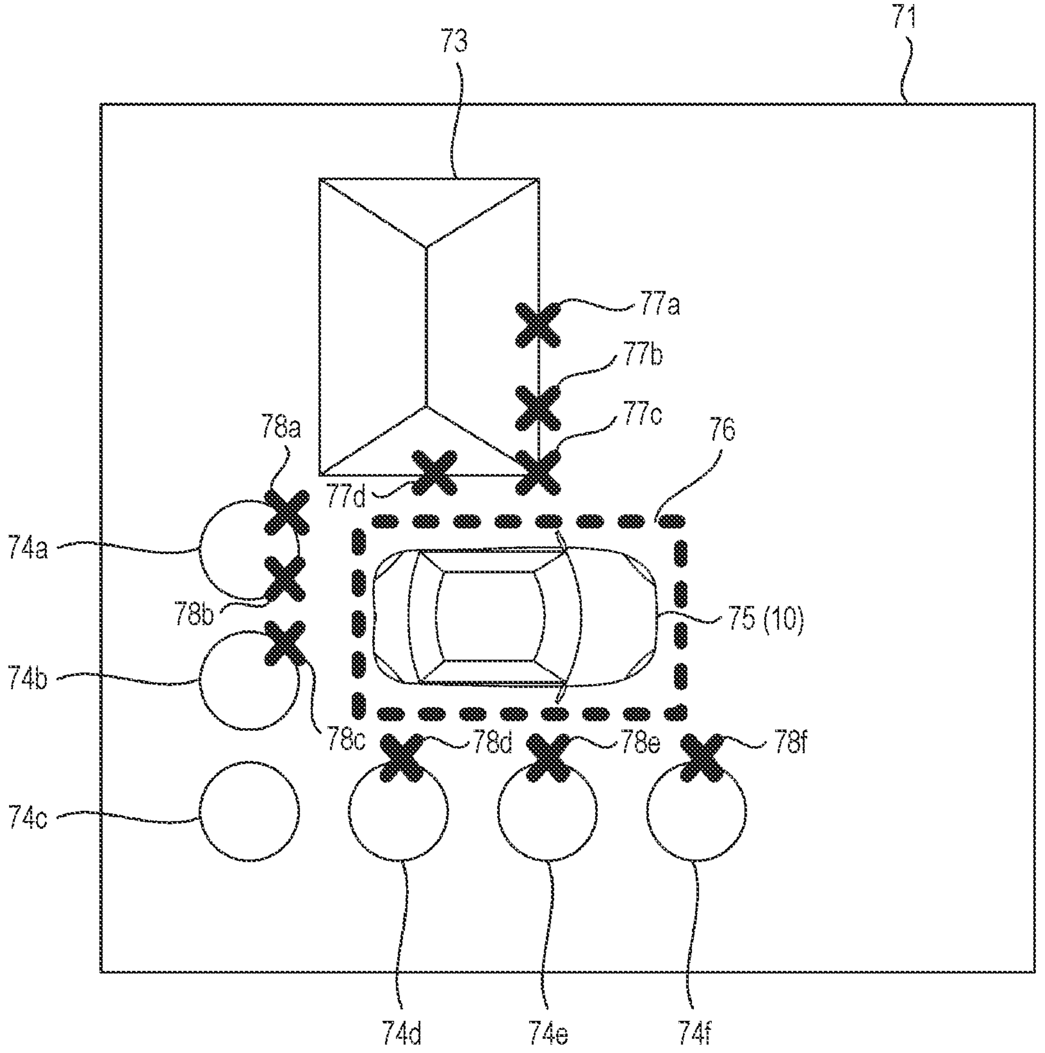
FIG. 6 is a view showing feature points with respect to the target parking position in FIG. 5.
Figure 7:
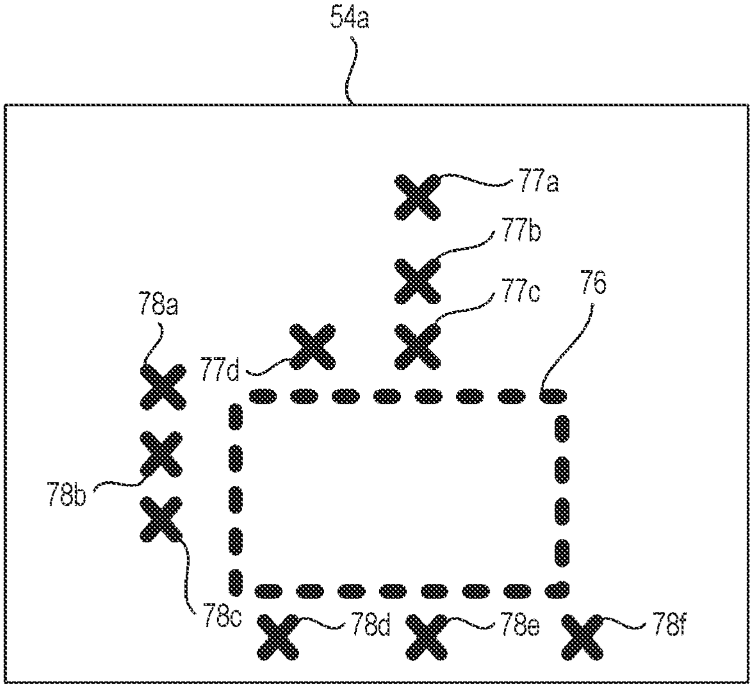
FIG. 7 is a view showing an example of a map of registration contents registered with respect to the target parking position.
Figure 8:
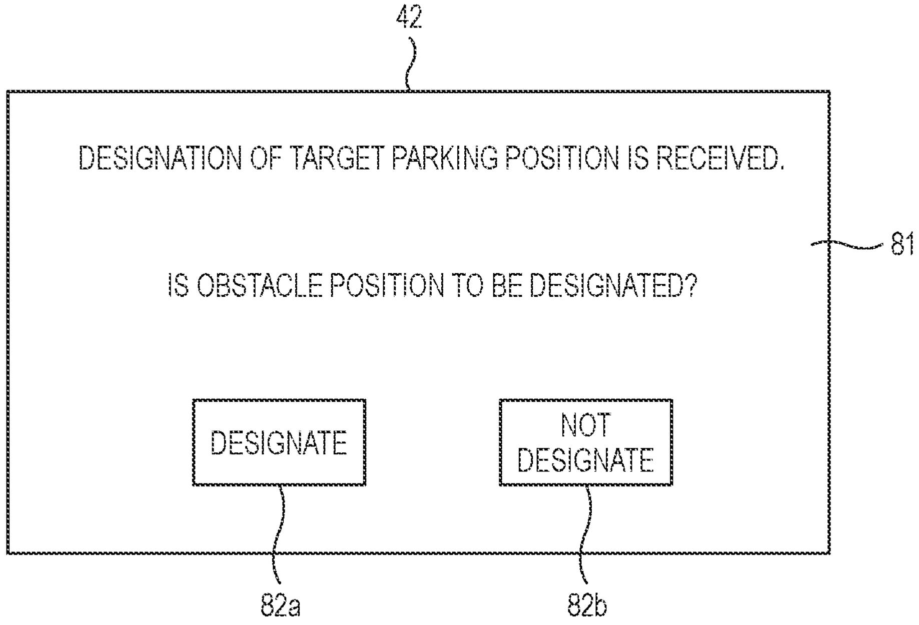
FIG. 8 is a diagram showing an example of a screen for inquiring whether it is necessary to designate an obstacle position.
Figure 9:
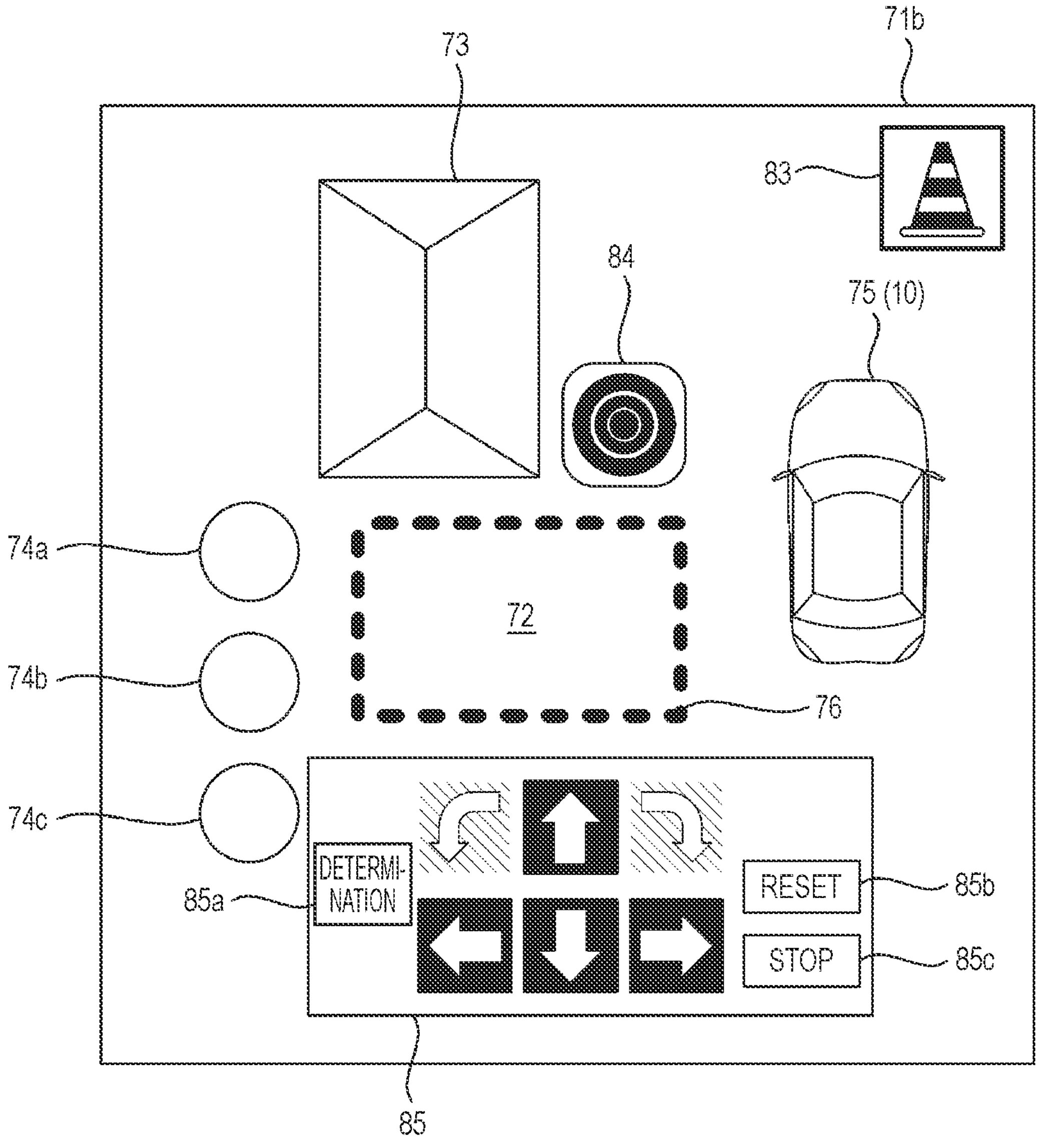
FIG. 9 is a view showing an example of a designation screen for designating the obstacle position.
Figure 10:
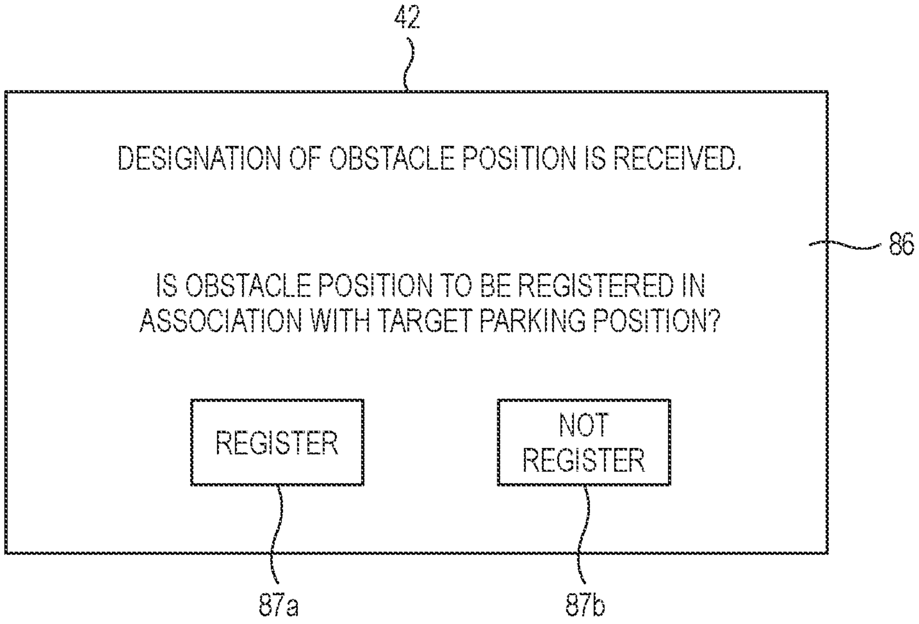
FIG. 10 is a diagram showing an example of a screen for inquiring whether it is necessary to register the obstacle position.
Figure 11:
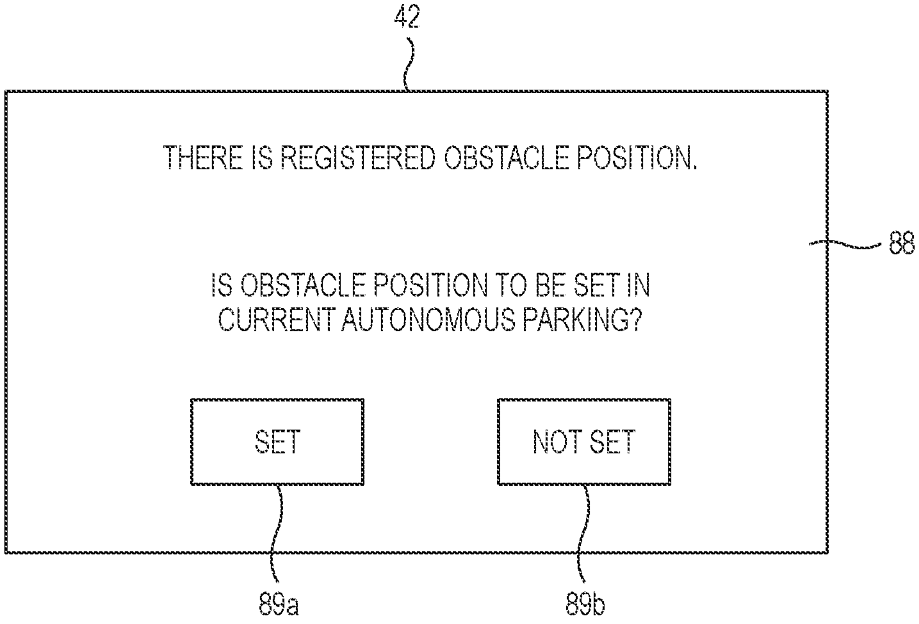
FIG. 11 is a diagram showing an example of a screen for inquiring whether it is necessary to set a designated obstacle position.

FIG. 4 is a flow chart showing the autonomous parking control for parking the vehicle 10 at a target parking position. FIG. 5 is a view in which a target parking position 76 is set in a top view image 71 generated based on recognition data of an external environment of the vehicle 10 acquired by the front camera 12Fr, the rear camera 12Rr, the left side camera 12L, and the right side camera 12R. FIG. 6 is a view showing feature points in a periphery of the target parking position 76 shown in FIG. 5. FIG. 7 is a view showing an example of a map of registration contents registered with respect to the target parking position. FIG. 8 is a diagram showing an example of a screen for inquiring whether it is necessary to designate an obstacle position. FIG. 9 is a view showing an example of a designation screen for designating the obstacle position. FIG. 10 is a diagram showing an example of a screen for inquiring whether it is necessary to register the obstacle position. FIG. 11 is a diagram showing an example of a screen for inquiring whether it is necessary to set a designated obstacle position.

For example, it is assumed that a user who drives the vehicle 10 arrives near a parking lot and taps the autonomous parking button (not shown) displayed on the touch panel 42 of the vehicle 10 in order to autonomously park the vehicle 10. When the autonomous parking button is tapped, an operation signal is received by the reception unit 56, and the top view image 71 of a periphery of the vehicle 10 as shown in FIG. 5, for example, is displayed on the touch panel 42. When the target parking position at which the vehicle 10 is parked is designated by the user in the top view image 71 displayed on the touch panel 42, the calculation unit 52 starts processing shown in FIG. 4. In this example shown in FIG. 5, a case where the user autonomously parks the vehicle 10 at the target parking position 76 of a home parking lot 72 will be described. The home parking lot 72 is provided between a house (building) 73 of the user and a plurality of planting (obstacles) 74*a* to 74*f*. The vehicle displayed in the top view image 71 is an image showing a state in which the vehicle 10 is viewed from above, and is a vehicle image 75 generated (captured) in advance and stored in the storage unit 54 or the like.

First, the autonomous parking control unit 55 of the calculation unit 52 receives designation of the target parking position 76 in the top view image 71 (step S11). The target parking position 76 can be designated, for example, by touching, on the touch panel 42, a rectangular frame (the target parking position 76) indicating a parking area of the vehicle 10 to slide the vehicle 10 to a desired parking position.

In step S11, when the designation of the target parking position 76 is received, the autonomous parking control unit 55 detects, based on the recognition data of the external environment acquired by the front camera 12Fr, the rear camera 12Rr, the left side camera 12L, and the right side camera 12R, feature points related to the designated target parking position 76, and determines, based on the detected feature points, what parking position the target parking position 76 is, for example, whether the target parking position is the home parking lot 72 of the user. Information on the feature points related to the target parking position 76 having a high parking frequency, such as the home parking lot 72, is registered in the storage unit 54.

For example, as in the top view image 71 shown in FIG. 6, the autonomous parking control unit 55 detects, as the feature points related to the designated target parking position 76, building feature points 77*a* to 77*d* indicating positions of an outline of the building 73 on a side close to the target parking position 76, obstacle feature points 78*a* to 78*f* indicating positions of the obstacles 74*a* to 74*f* present around the target parking position 76, and the like.

The autonomous parking control unit 55 determines a parking position by calculating a matching rate between the detected building feature points 77*a* to 77*d*, obstacle feature points 78*a* to 78*f*, and the like related to the target parking position 76 and the feature points related to the target parking position 76 of the parking lot registered in the storage unit 54. The feature points related to the target parking position 76 of the home parking lot 72 of the user are registered as, for example, a map 54*a* indicating a relationship between the building feature points 77*a* to 77*d*, the obstacle feature points 78*a* to 78*f*, and the target parking position 76, as shown in FIG. 7. When the matching rate of the feature points is higher than a predetermined value, the autonomous parking control unit 55 determines that the target parking position 76 at which the vehicle 10 is currently to be parked is the target parking position 76 of the home parking lot 72 of the user. In this example, the user autonomously parks the vehicle 10 at the home parking lot 72, and the autonomous parking control unit 55 determines that the target parking position is the target parking position 76 of the home parking lot 72 of the user.

Next, the autonomous parking control unit 55 determines whether a designated obstacle position registered in association with the target parking position 76 is stored in the storage unit 54 (step S12). As described above, the designated obstacle position is a position of an object that is present in the periphery of the target parking position 76 and that is designated as an obstacle by the user.

In step S12, when there is no designated obstacle position registered in association with the target parking position 76 (step S12: No), the autonomous parking control unit 55 inquires of the user whether it is necessary to designate an obstacle position, that is, whether there is an object designated as an obstacle in the current autonomous parking (step S13). As shown in FIG. 8, the inquiry to the user is made, for example, by displaying, on the touch panel 42, an inquiry message 81 such as "DESIGNATION OF TARGET PARKING POSITION IS RECEIVED. IS OBSTACLE POSITION TO BE DESIGNATED?", a button 82*a* for designating the obstacle position, and a button 82*b* for not designating.

Next, the autonomous parking control unit 55 determines whether there is a response to designate the obstacle position in response to the inquiry in step S13, that is, whether the button 82*a* for designating with respect to the inquiry message 81 shown in FIG. 8 is tapped (step S14).

In step S14, when there is no response to designate the obstacle position, that is, the button 82*b* for not designating in FIG. 8 is tapped (step S14: No), the autonomous parking control unit 55 calculates a movement path of the vehicle 10 to the target parking position 76 based on the recognition data of the external environment acquired by the front camera 12Fr, the rear camera 12Rr, the left side camera 12L, and the right side camera 12R and the feature points (the building feature points 77*a* to 77*d* and the obstacle feature points 78*a* to 78*f*) of the target parking position 76 (step S15).

Then, the autonomous parking control unit 55 autonomously parks the vehicle 10 at the target parking position 76 based on the movement path calculated in step S15 (step S16).

On the other hand, in step S14, when there is a response to designate the obstacle position, that is, when the button 82*a* for designating in FIG. 8 is tapped (step S14: Yes), the autonomous parking control unit 55 displays an obstacle designation screen for designating the obstacle position on the touch panel 42 (step S17). FIG. 9 is a view showing an example of the obstacle designation screen. As shown in FIG. 9, an obstacle designation screen 71*a* is displayed as a top view image in which an obstacle marker 83 for displaying an obstacle to be designated by the user is attached and displayed. The user can dispose an obstacle at any position by swiping the obstacle marker 83. The autonomous parking control unit 55 displays the obstacle disposed by an operation of the user as, for example, an obstacle mark 84 on the obstacle designation screen 71*a*. The example shown in FIG. 9 shows a state in which the obstacle mark 84 is disposed in front of the building 73 close to the target parking position 76. A plurality of obstacle marks 84 may be arranged.

The autonomous parking control unit 55 displays an operation panel 85 on the obstacle designation screen 71*a*. The operation panel 85 is an operation panel by which a position of the disposed obstacle mark 84 can be moved. After touching and selecting the disposed obstacle mark 84, the user can move the disposed obstacle mark 84 in any arrow direction with a cursor of the operation panel 85. The autonomous parking control unit 55 displays, on the operation panel 85, a determination button 85*a* for determining the disposition of the obstacle mark 84, a reset button 85*b* for canceling the disposition of the obstacle mark 84, and a stop button 85*c* for stopping the disposition of the obstacle mark 84.

Next, the autonomous parking control unit 55 determines whether the designation of the obstacle position is received on the obstacle designation screen 71*a* displayed in step S17 (step S18).

In step S18, when the designation of the obstacle position is not received, that is, when the stop button 85*c* is tapped on the operation panel 85 shown in FIG. 9 (step S18: No), the autonomous parking control unit 55 proceeds to step S15 and executes the processing.

In step S18, when the designation of the obstacle position is received, that is, when the determination button 85*a* is tapped on the operation panel 85 shown in FIG. 9 (step S18: Yes), the autonomous parking control unit 55 inquires of the user whether it is necessary to register the target parking position 76 and the obstacle position, that is, whether to register a designated obstacle position in association with the target parking position 76 (step S19). As shown in FIG. 10, the inquiry to the user is made by displaying, on the touch panel 42, for example, an inquiry message 86 such as "DESIGNATION OF OBSTACLE POSITION IS RECEIVED. IS OBSTACLE POSITION TO BE REGISTERED IN ASSOCIATION WITH TARGET PARKING POSITION?", a button 87*a* for registering in association with the target parking position 76, and a button 87*b* for not registering.

Next, the autonomous parking control unit 55 determines whether there is a response to register the obstacle position in response to the inquiry in step S19, that is, whether the button 87*a* for registering with respect to the inquiry message 86 shown in FIG. 10 is tapped (step S20).

In step S20, when there is a response to register the obstacle position, that is, when the button 87*a* for registering in FIG. 10 is tapped (step S20: Yes), the autonomous parking control unit 55 registers the obstacle position as the designated obstacle position in association with the target parking position 76 (step S21).

Next, the autonomous parking control unit 55 calculates a movement path of the vehicle 10 to the target parking position 76, that is, a movement path avoiding the designated obstacle position, based on the recognition data of the external environment acquired by the front camera 12Fr, the rear camera 12Rr, the left side camera 12L, and the right side camera 12R, the feature points (the building feature points 77*a* to 77*d* and the obstacle feature points 78*a* to 78*f*) of the target parking position 76, and the designated obstacle position (step S22).

On the other hand, in step S20, when there is no response to register the obstacle position, that is, when the button 87*b* for not registering in FIG. 10 is tapped (step S20: No), the autonomous parking control unit 55 proceeds to step S22 as it is, and calculates the movement path avoiding the designated obstacle position.

Next, the autonomous parking control unit 55 autonomously parks the vehicle 10 at the target parking position 76 based on the movement path calculated in step S22 (step S16).

On the other hand, in step S12, when there is a designated obstacle position registered in association with the target parking position 76 (step S12: Yes), the autonomous parking control unit 55 inquires of the user whether to set the designated obstacle position, that is, whether to dispose the designated obstacle position as the obstacle mark 84 in the current autonomous parking (step S23). As shown in FIG. 11, the inquiry to the user is made by displaying, on the touch panel 42, for example, an inquiry message 88 such as "THERE IS REGISTERED OBSTACLE POSITION. IS OBSTACLE POSITION TO BE SET IN CURRENT AUTONOMOUS PARKING?", a button 89*a* for setting the obstacle position, and a button 89*b* for not setting.

Next, the autonomous parking control unit 55 determines whether there is a response to set the designated obstacle position in response to the inquiry in step S23, that is, whether the button 89*a* for setting with respect to the inquiry message 88 shown in FIG. 11 is tapped (step S24).

In step S24, when there is no response to set the designated obstacle position, that is, the button 89*b* for not setting in FIG. 11 is tapped (step S24: No), the autonomous parking control unit 55 proceeds to step S13, and executes the processing.

In step S24, when there is a response to set the designated obstacle position, that is, when the button 89*a* for setting in FIG. 11 is tapped (step S24: Yes), the autonomous parking control unit 55 sets the registered designated obstacle position, that is, disposes the obstacle mark 84 as the obstacle position (step S25).

Next, the autonomous parking control unit 55 proceeds to step S22, and calculates a movement path avoiding the set designated obstacle position. Here, the movement path avoiding the set designated obstacle position is calculated, and for example, it may be possible to inquire again whether it is necessary to designate another obstacle position. When designation of the other obstacle position is received, a movement path avoiding the obstacle position and also avoiding the other obstacle position may be calculated.

In step S19 and step S20, an example has been described in which the user is inquired whether it is necessary to register the target parking position 76 and the obstacle position, and the target parking position 76 and the obstacle position are registered in association with each other when there is a response indicating the registration, but the present disclosure is not limited thereto. For example, the autonomous parking control unit 55 may register the designated obstacle position in association with the target parking position 76 according to the parking history of the vehicle 10 at the target parking position 76 without inquiring the user whether to perform the registration. Specifically, when the same obstacle position at the same target parking position 76 is repeatedly designated twice, but each time, there is no response to register in response to an inquiry about the necessity of registration, and when the designation is repeated a third time, the autonomous parking control unit 55 may register the designated obstacle position in association with the target parking position 76 without inquiring the user about the necessity of registration.

As described above, the autonomous parking control unit 55 of the calculation unit 52 registers the obstacle position designated by the user as the designated obstacle position in association with the target parking position 76, and performs control to park the vehicle 10 at the target parking position based on the registered designated obstacle position. Accordingly, it is not necessary to designate the obstacle position each time when the vehicle 10 is parked at the same parking position, and thus it is possible to reduce a burden on the user when the vehicle 10 is autonomously parked.

The autonomous parking control unit 55 inquires of the user whether to register, in association with the target parking position 76, the obstacle position designated by the user, and determines whether to register the obstacle position according to a response from the user. Accordingly, it is possible to select whether to register the obstacle position according to whether a target parking position at which the vehicle 10 is to be autonomously parked is a parking position to be temporarily used, and it is possible to prevent unnecessary registration of the obstacle position.

The autonomous parking control unit 55 registers the obstacle position according to the parking history of the vehicle 10 at the target parking position 76 without inquiring the user. Accordingly, it is possible to reduce inquiries to the user and responses from the user regarding registration of an obstacle position with respect to a target parking position having a high parking frequency such as a home parking lot or a monthly parking lot, and it is possible to reduce the burden on the user when the vehicle 10 is autonomously parked.

When the target parking position 76 and the obstacle position are already registered in association with each other, the autonomous parking control unit 55 does not inquire of the user regarding the registration of the obstacle position. Accordingly, it is possible to reduce unnecessary inquiries to the user regarding the registration of the obstacle position and unnecessary responses from the user, and to reduce the burden on the user.

<First Modification of Autonomous Parking Control Performed by Calculation Unit 52>

Next, a first modification of the autonomous parking control of the vehicle 10 performed by the calculation unit 52 will be described with reference to a flow chart in FIG. 12.

Figure 12:
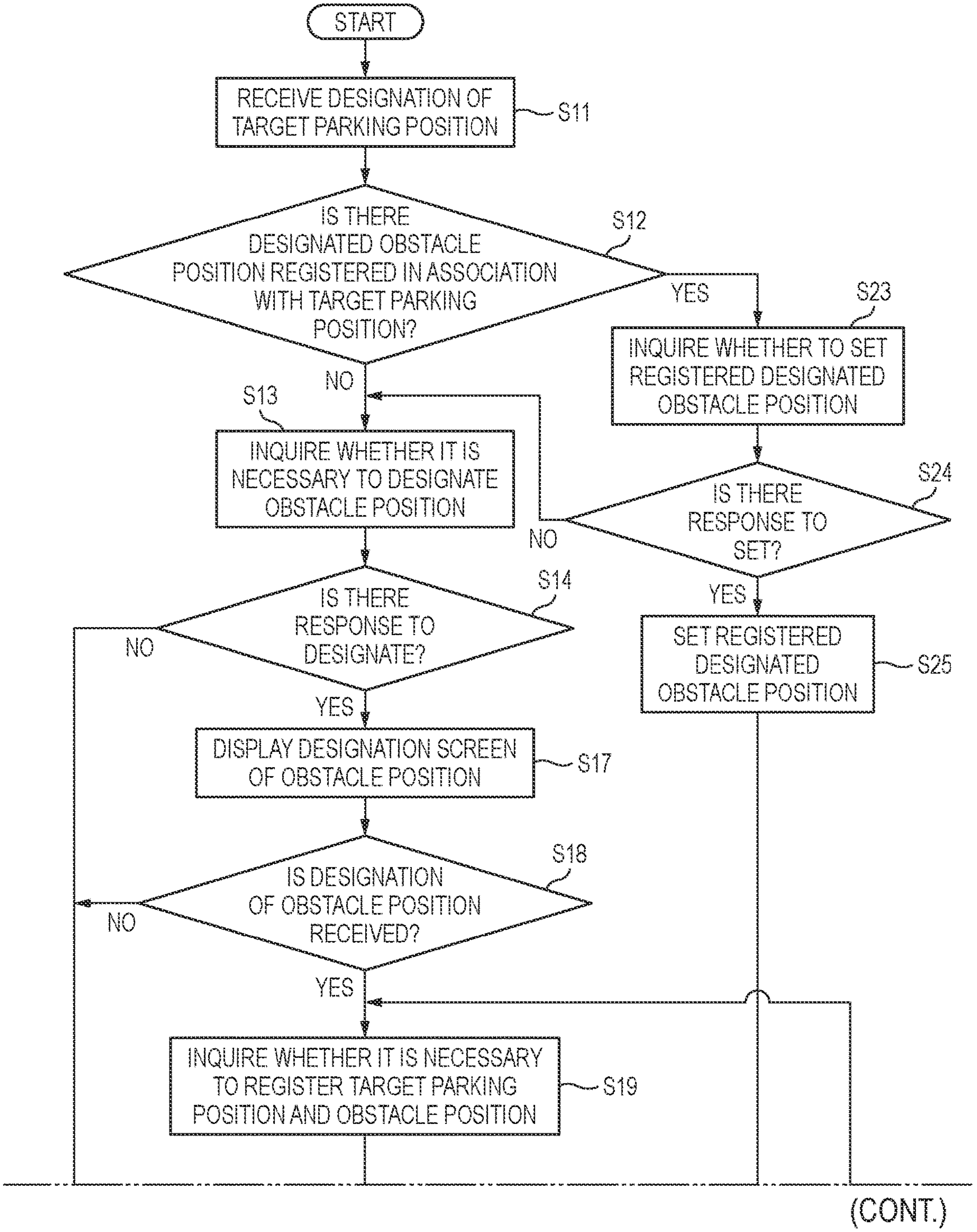
FIG. 12 is a flow chart showing autonomous parking control in a first modification.

As shown in FIG. 12, in autonomous parking control in the first modification, the processing from step S11 to step S22-1 and the processing from step S23 to step S25 are the same as the processing from step S11 to step S22 and the processing from step S23 to step S25 in the autonomous parking control shown in FIG. 4. Therefore, the description of the processing of the steps will be omitted.

When the movement path avoiding the obstacle position is calculated in step S22-1, the autonomous parking control unit 55 determines whether it is possible to park the vehicle 10 based on the calculated movement path (step S22-2). In this case, the fact that parking is not possible includes not only a case where parking is not possible because it is not possible to avoid the obstacle position, but also a case where parking is not possible because a degree of risk exceeds a predetermined value when the obstacle position is avoided. The case where the degree of risk exceeds the predetermined value includes, for example, a case where it is necessary to repeat turning of a steering wheel many times in order to avoid an obstacle position, and a case where it is necessary to make a large detour.

In step S22-2, when the parking is possible (step S22-2: Yes), the autonomous parking control unit 55 proceeds to step S16, and autonomously parks the vehicle 10 at the target parking position 76.

In step S22-2, when the parking is not possible (step S22-2: No), the autonomous parking control unit 55 displays a notification message (not shown) prompting the user to change a position of the disposed obstacle mark 84, such as "IS DESIGNATED OBSTACLE POSITION (OBSTACLE MARK 84) CHANGEABLE?". The change of the position includes a case of removing the disposed obstacle mark 84, a case of shifting the position of the obstacle mark 84 within an allowable range, and the like. Next, the autonomous parking control unit 55 displays, on the touch panel 42, the obstacle designation screen 71*a* (see FIG. 9) on which the obstacle mark 84 is disposed (step S22-3). When the position of the obstacle mark 84 can be changed, the user changes the position by operating the touch panel 42. An operation method for moving the obstacle mark 84 is as described above in step S17.

Next, in step S22-4, when the obstacle position (the obstacle mark 84) is changed (step S22-4: Yes), the autonomous parking control unit 55 returns to step S19, and repeats the processing of each step.

In step S22-4, when the obstacle position (the obstacle mark 84) is not changed (step S22-4: No), the autonomous parking control unit 55 determines that the parking is not possible, and ends the processing.

As described above, the autonomous parking control unit 55 of the calculation unit 52 in the first modification performs the notification prompting the user to change the obstacle position according to a calculation result of the movement path of the vehicle 10 to the target parking position 76 based on the obstacle position. Accordingly, it is possible to change the obstacle position (the obstacle mark 84) within an allowable range of the user, and it is possible to increase an execution frequency of the autonomous parking control of the vehicle 10.

<Second Modification of Autonomous Parking Control Performed by Calculation Unit 52>

Figure 13:
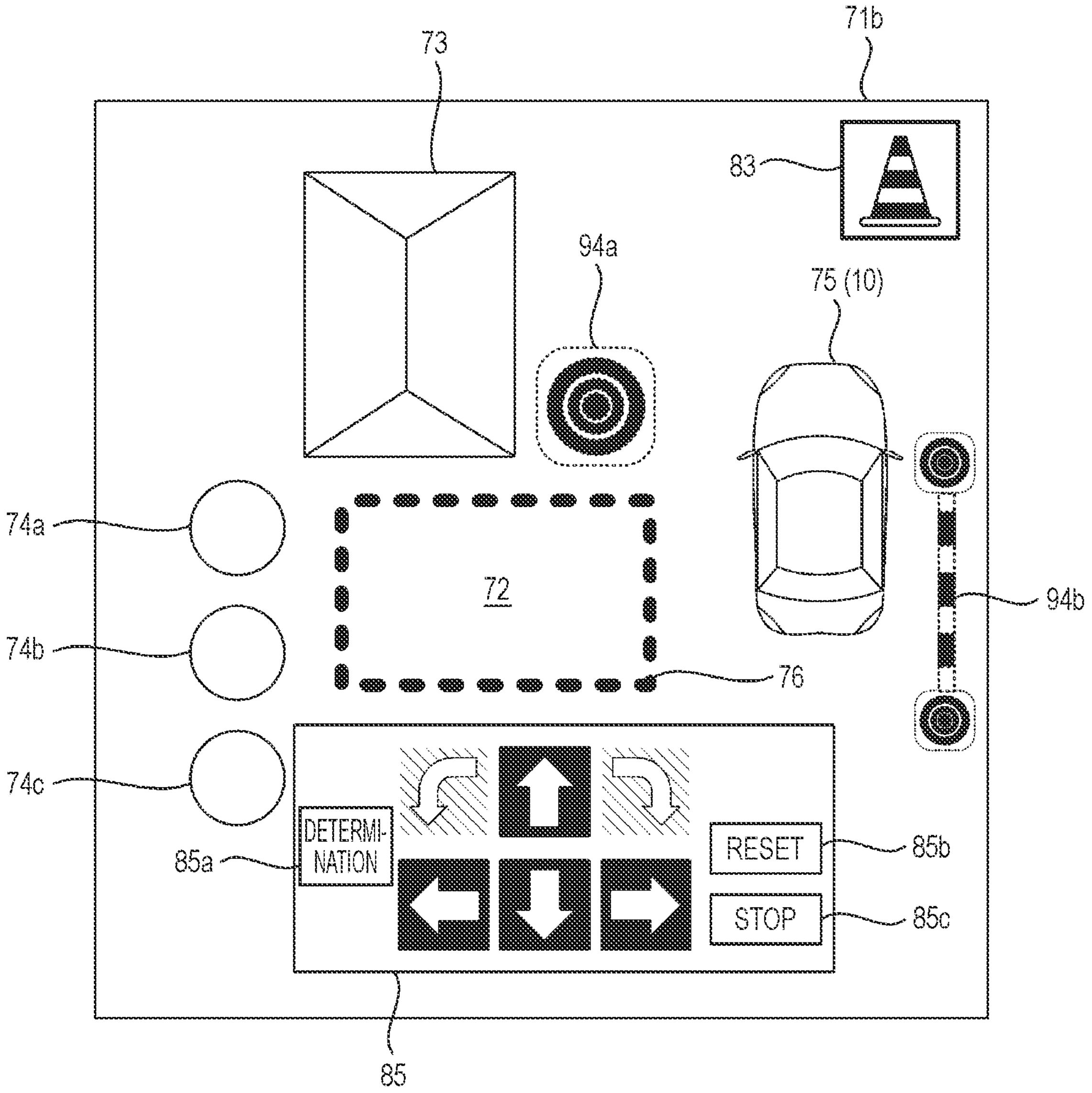
FIG. 13 is a view showing an example of an obstacle designation screen displayed in autonomous parking control in a second modification.

Next, a second modification of the autonomous parking control of the vehicle 10 performed by the calculation unit 52 will be described with reference to FIG. 13. FIG. 13 is a view showing an obstacle designation screen 71*b* for designating an obstacle position. The obstacle designation screen 71*b* corresponds to the obstacle designation screen 71*a* displayed in the processing of step S17 in the autonomous parking control shown in FIG. 4.

In autonomous parking control in the second modification, as shown in FIG. 13, the autonomous parking control unit 55 displays in advance, on the obstacle designation screen 71*b*, a transparent obstacle mark 94 (for example, obstacle marks 94*a* and 94*b*) as a candidate for an obstacle position, and performs a notification to the user. The candidate for the obstacle position refers to a position of an object that may be designated by the user as an obstacle, and refers to a position of an obstacle that is predicted and displayed by an autonomous parking control unit 55 side. Specifically, the autonomous parking control unit 55 predicts that the user may dispose an obstacle mark in front of the building 73 close to the target parking position 76, and displays the transparent obstacle mark 94*a* as a candidate. The autonomous parking control unit 55 predicts that the user may dispose the obstacle mark at a ground facing the target parking position 76, and displays the transparent bar-shaped obstacle mark 94*b* as a candidate.

When the displayed obstacle mark 94*a* or 94*b* is tapped by the user, the autonomous parking control unit 55 receives a position of the tapped obstacle mark as an obstacle position designated by the user. The autonomous parking control unit 55 changes a display state of the tapped obstacle mark from a transparent state to a non-transparent state for display. An operation method for moving the obstacle mark using the operation panel 85 displayed in the obstacle designation screen 71*b* is the same as that described above. For example, the bar-shaped obstacle mark 94*b* can be rotationally moved with a curved arrow cursor of the operation panel 85.

As described above, the autonomous parking control unit 55 of the calculation unit 52 in the second modification displays the candidates for the obstacle position on the touch panel 42 and performs the notification to the user, and receives the designation of the obstacle position selected by the user from the displayed candidates for the obstacle position. Accordingly, the obstacle position can be designated simply by tapping the obstacle marks 94*a* and 94*b* displayed as the candidates, a designation operation is made easy, and a burden at the time of setting the obstacle position can be reduced.

The autonomous parking control unit 55 displays and notifies the user of a candidate selected by the user and a candidate not selected by the user in the candidates for the obstacle position on the touch panel 42 in different modes. Accordingly, for example, by displaying the non-transparent obstacle mark 84 and the transparent obstacle marks 94*a* and 94*b* in different modes, visibility of the obstacle position can be improved, and an erroneous operation at the time of setting the obstacle position can be prevented.

<Another Example of Display of Top View Image 71>

Figure 14:
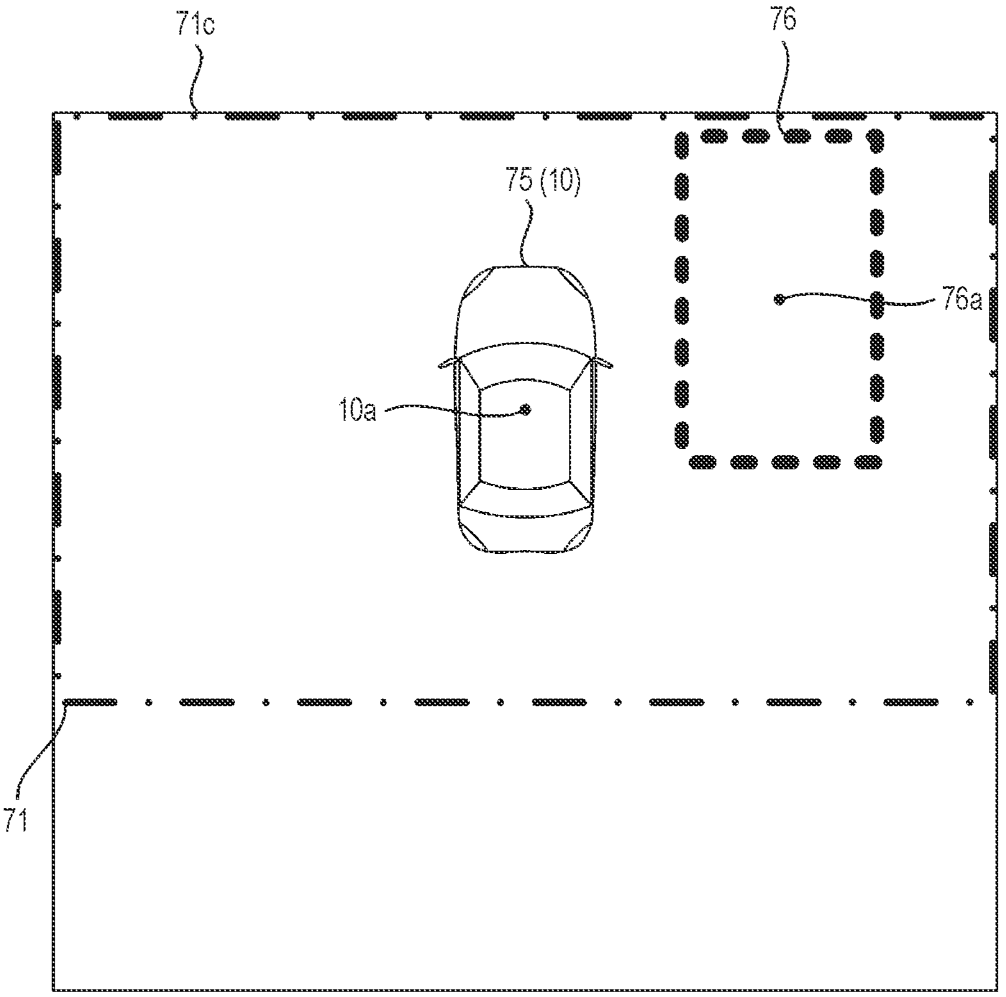
FIG. 14 is a view showing a first example of a top view image 71 before a target parking position 76 is determined.

FIG. 14 is a view showing a first example of the top view image 71 before the target parking position 76 is determined. The autonomous parking control unit 55 may display a target parking position designation screen 71*c* shown in FIG. 14, for example, when the designation of the target parking position 76 is received in step S11 shown in FIG. 4, that is, before the target parking position 76 is determined. The target parking position designation screen 71*c* shown in FIG. 14 includes the top view image 71 which is a peripheral image of the vehicle 10, and the autonomous parking control unit 55 receives the designation of the target parking position 76 using the top view image 71.

The target parking position 76 can be designated, for example, by touching the target parking position 76 on the touch panel 42 and sliding the target parking position 76 to a portion corresponding to a position at which the vehicle 10 is desired to be parked in the top view image 71. The designation of the target parking position 76 may include designation of rotation of the target parking position 76 and the like.

A display of the top view image 71 of the target parking position designation screen 71*c* shown in FIG. 14 is a display of a peripheral image centered on a center point 10*a* of the vehicle 10 in a traveling direction of the vehicle 10 (a vertical direction of the screen), and is an example of a first display based on the center point 10*a* of the vehicle 10. Accordingly, it is possible to easily designate the target parking position 76 with reference to a position of the vehicle 10.

Figure 15:
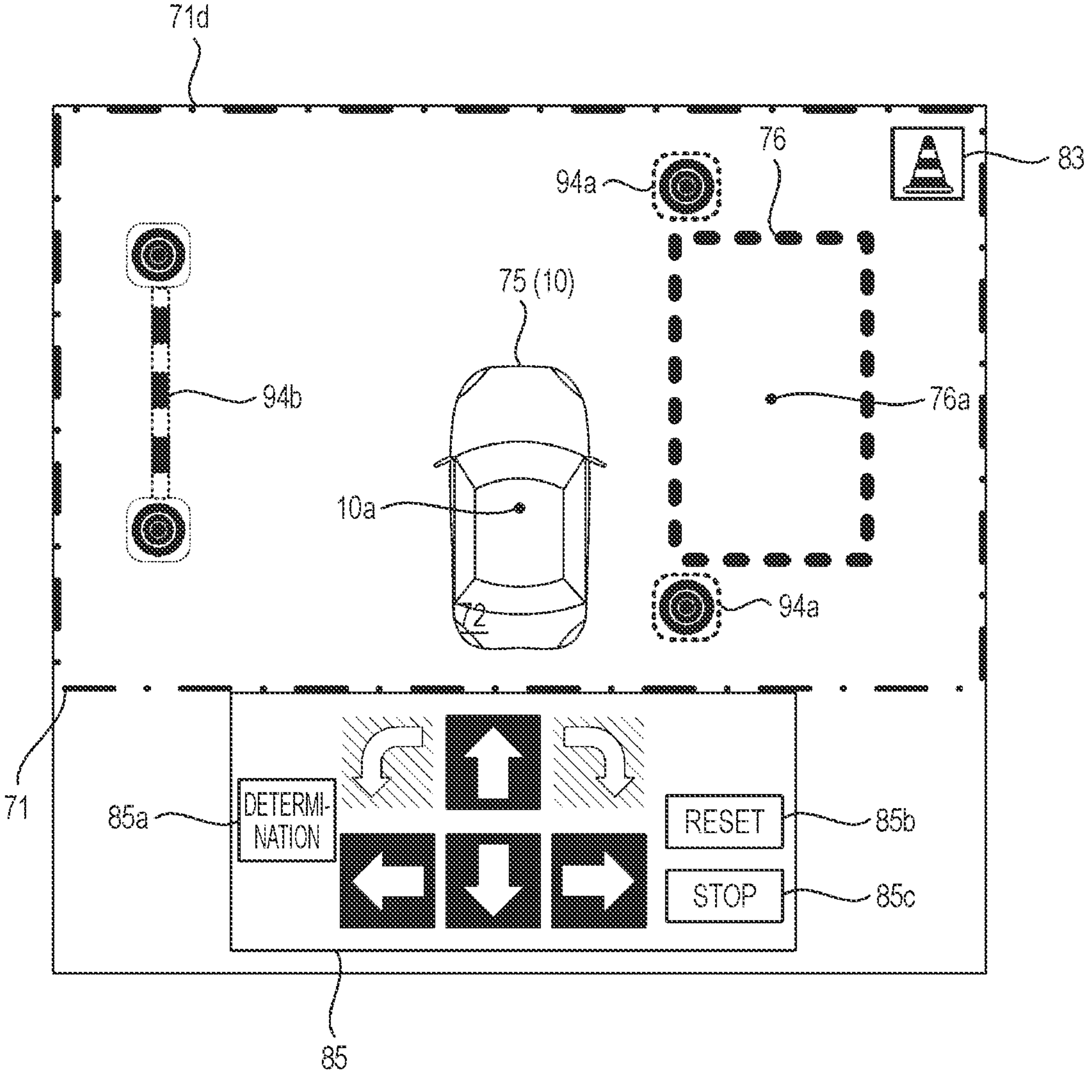
FIG. 15 is a view showing a first example of the top view image 71 after the target parking position 76 is determined.

FIG. 15 is a view showing a first example of the top view image 71 after the target parking position 76 is determined. In the example shown in FIG. 15, the autonomous parking control unit 55 may display an obstacle designation screen 71*d* shown in FIG. 15, for example, when the designation of the obstacle position is received in step S18 shown in FIG. 4, that is, after the target parking position 76 is determined.

The obstacle designation screen 71*d* includes the top view image 71, the obstacle marker 83, the operation panel 85, and the like, similarly to the obstacle designation screen 71*a* shown in FIG. 9 and the obstacle designation screen 71*b* shown in FIG. 13. The obstacle designation screen 71*d* may include the obstacle marks 94*a* and 94*b*, similarly to the obstacle designation screen 71*b* shown in FIG. 13. As in the examples of FIGS. 9 and 15, the autonomous parking control unit 55 receives the designation of the obstacle position using the obstacle designation screen 71*d*.

A display of the top view image 71 of the obstacle designation screen 71*d* shown in FIG. 15 is a display of a peripheral image centered on a center point 76*a* of the determined target parking position 76 in a traveling direction of the vehicle 10 (a vertical direction of the screen), and is an example of a second display based on the center point 76*a* of the target parking position 76. Accordingly, it is possible to easily designate an obstacle position with reference to the determined target parking position 76.

The top view image 71 at this time has the center point 76*a* of the target parking position 76 as a reference (a center). Therefore, even in a case where the vehicle 10 and the target parking position 76 are separated from each other or the like, it is possible to prevent a position that the user desires to designate as an obstacle position or the obstacle marks 94*a* and 94*b* to be displayed as the candidates for the obstacle position from being out of a range of the top view image 71, thereby preventing difficulty in designating the obstacle position.

Figure 16:
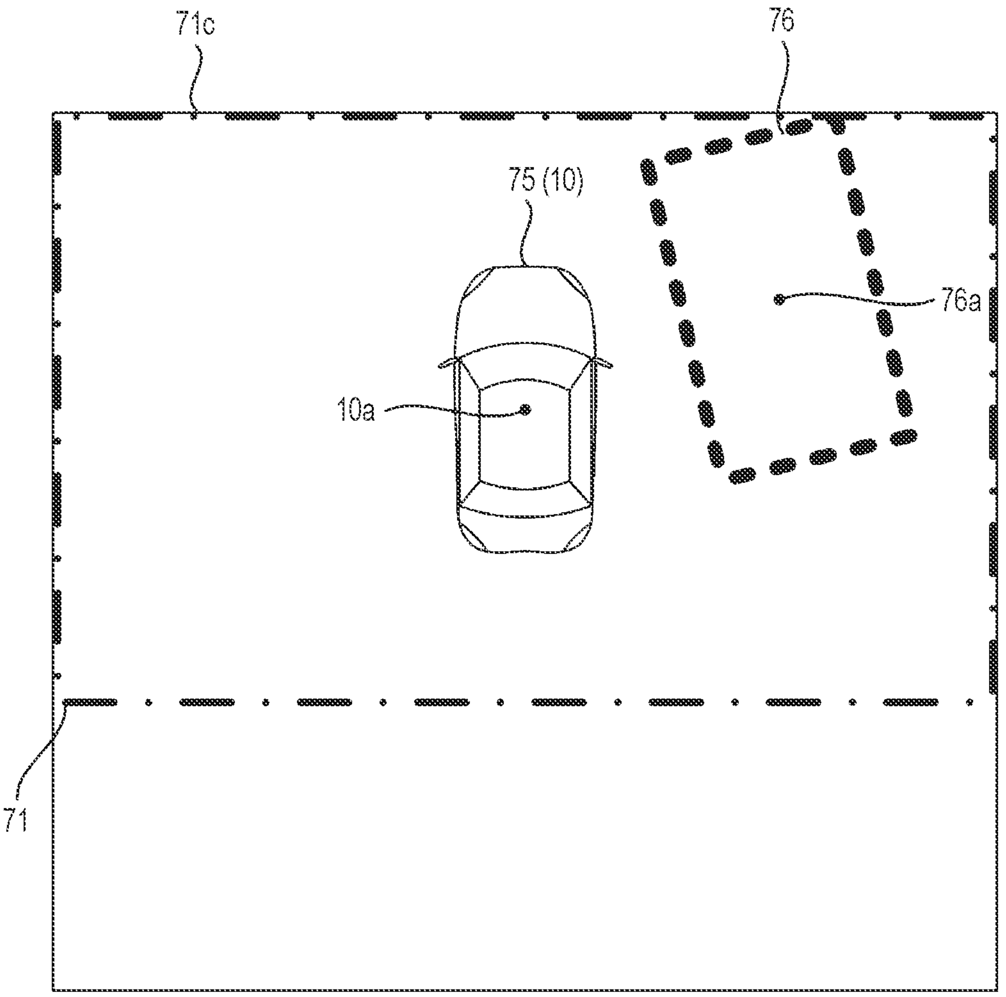
FIG. 16 is a view showing a second example of the top view image 71 before the target parking position 76 is determined.
Figure 17:
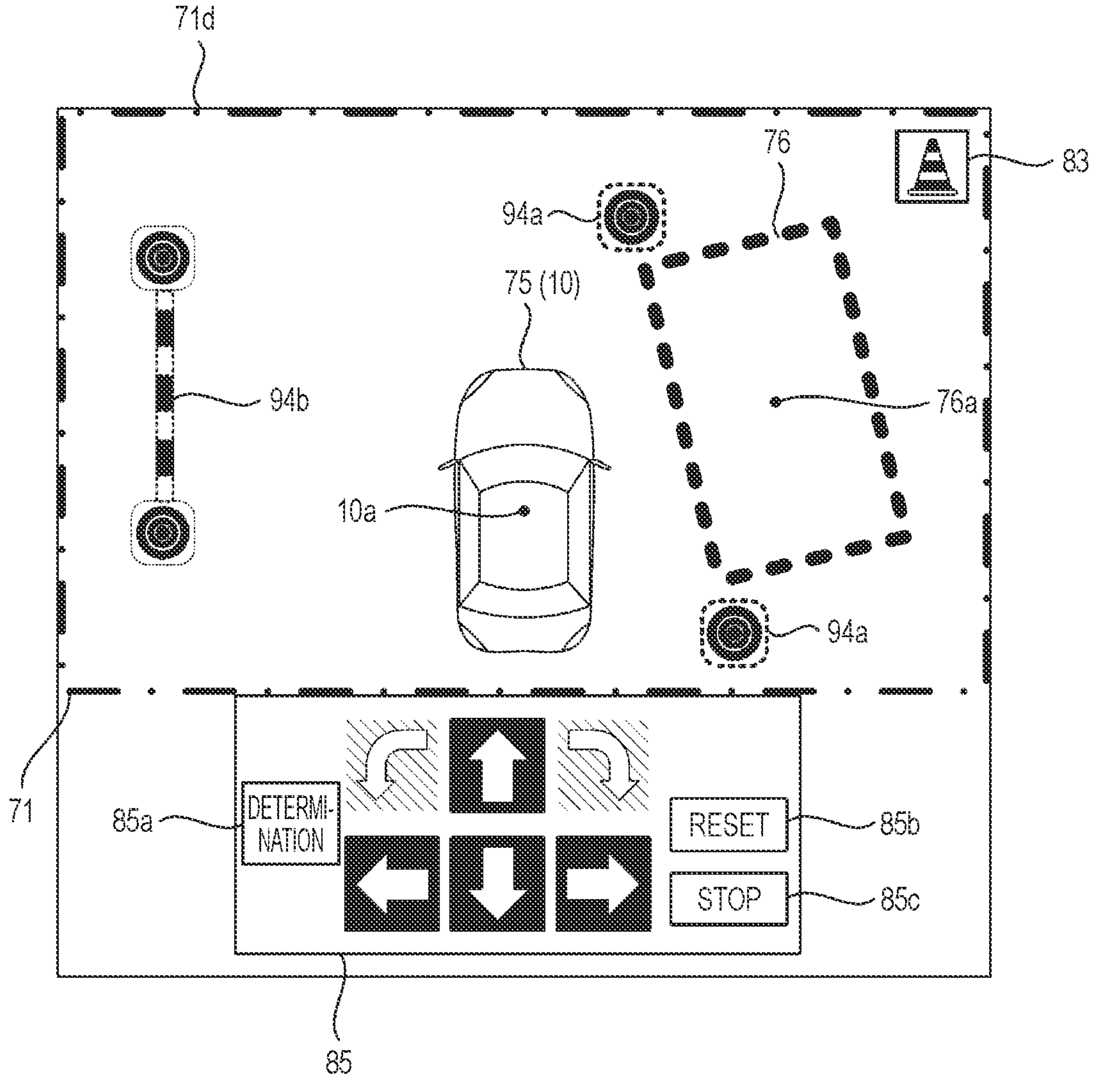
FIG. 17 is a view showing a second example of the top view image 71 after the target parking position 76 is determined.

FIG. 16 is a view showing a second example of the top view image 71 before the target parking position 76 is determined. FIG. 17 is a view showing a second example of the top view image 71 after the target parking position 76 is determined. In the example of FIG. 16, on the target parking position designation screen 71*c* before the target parking position 76 is determined, the target parking position 76 in a state of being rotated with respect to the example shown in FIG. 14 is designated. Also in this case, as shown in FIG. 17, the top view image 71 of the obstacle designation screen 71*d* after the target parking position 76 is determined is the peripheral image centered on the center point 76*a* of the determined target parking position 76 in the traveling direction of the vehicle 10 (the vertical direction of the screen).

Figure 18:
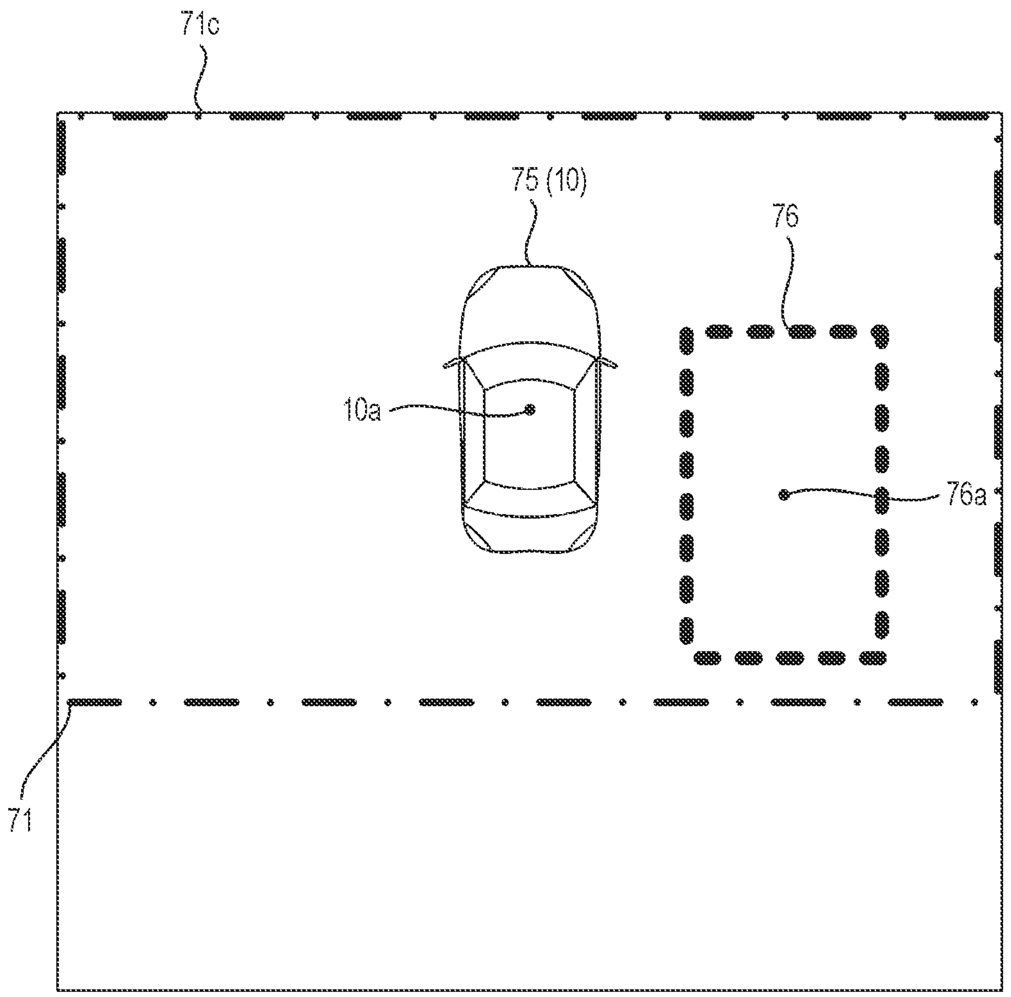
FIG. 18 is a view showing a third example of the top view image 71 before the target parking position 76 is determined.
Figure 19:
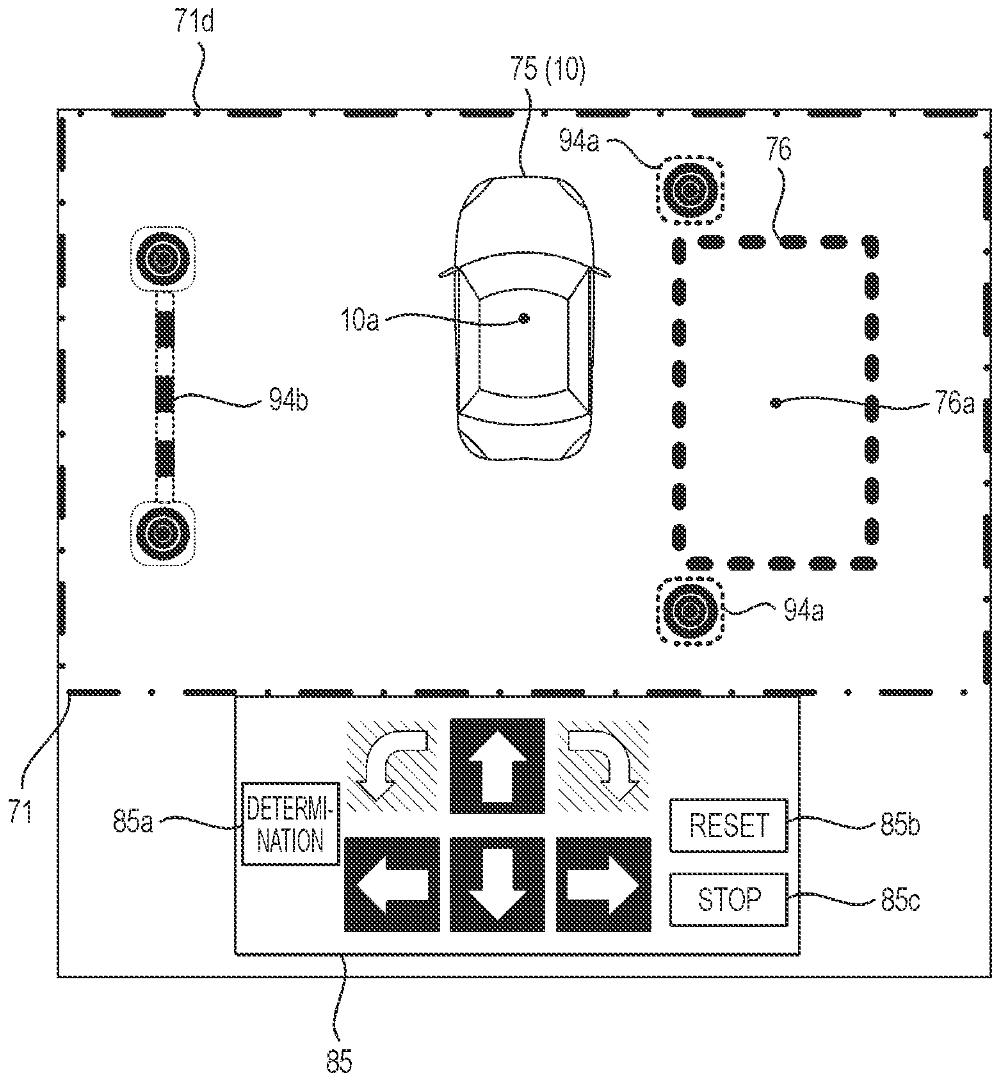
FIG. 19 is a view showing a third example of the top view image 71 after the target parking position 76 is determined.

FIG. 18 is a view showing a third example of the top view image 71 before the target parking position 76 is determined. FIG. 19 is a view showing a third example of the top view image 71 after the target parking position 76 is determined. In the example of FIG. 18, on the target parking position designation screen 71*c* before the target parking position 76 is determined, the target parking position 76 on a rear side with respect to the example shown in FIG. 14 is designated. Also in this case, as shown in FIG. 19, the top view image 71 of the obstacle designation screen 71*d* after the target parking position 76 is determined is the peripheral image centered on the center point 76*a* of the determined target parking position 76 in the traveling direction of the vehicle 10 (the vertical direction of the screen).

In this way, when the designation of the target parking position 76 is received or when the designation of the obstacle position is received, the autonomous parking control unit 55 performs control to cause the touch panel 42 (a display unit) to display the top view image 71 that is the peripheral image of the vehicle 10. When the designation of the obstacle position is received or when the target parking position 76 is determined, the autonomous parking control unit 55 performs the display with reference to the center point 76*a* of the target parking position 76.

Specifically, the autonomous parking control unit 55 performs the first display (the display of the target parking position designation screen 71*c* in FIGS. 14, 16, and 18) with reference to the center point 10*a* of the vehicle 10 before the target parking position 76 is determined, and performs the second display (the display of the obstacle designation screen 71*d* in FIGS. 15, 17, and 19) with reference to the center point 76*a* of the target parking position 76 after the target parking position 76 is determined. That is, the autonomous parking control unit 55 offsets the display of the top view image 71 before and after the target parking position 76 is determined.

Accordingly, when the designation of the obstacle position is received, by using the obstacle designation screen 71*d* including the top view image 71 with reference to the center point 76*a* of the target parking position 76, it is possible to prevent difficulty in the designation of the obstacle position.

In the examples of FIGS. 14 to 19, a case where the second display is performed with reference to the center point 76*a* of the target parking position 76 in the traveling direction of the vehicle 10 (the vertical direction of the screen) has been described, but a second display may be performed with reference to the center point 76*a* of the target parking position 76 in a direction orthogonal to the traveling direction of the vehicle 10 (a horizontal direction of the screen) according to a restriction of a layout of the screen or the like.

<Another Example of Display of Obstacle Marker 83>

The obstacle marker 83, which is an icon for receiving the designation of the obstacle position from the user, is displayed in a predetermined positional relationship with respect to the center point 10*a* of the vehicle 10 in the top view image 71, for example. Therefore, in the example of FIG. 19, as a result of displaying the top view image 71 centered on the center point 76*a* of the target parking position 76 instead of the center point 10*a* of the vehicle 10, the obstacle marker 83 is out of the range of the top view image 71 and is hidden.

In order to prevent this, the autonomous parking control unit 55 may display the obstacle marker 83 in a superimposed manner on another image different from the top view image 71. The other image on which the obstacle marker 83 is superimposed may be, for example, a selection image of a parking mode (for example, any one of autonomous parking and remote parking) displayed adjacent to the target parking position 76 (the top view image 71). Accordingly, it is possible to prevent the obstacle marker 83 from being hidden when the designation of the obstacle position is received from the user. In addition, it is possible to prevent the obstacle marker 83 from overlapping with an object in the top view image 71 and reducing the visibility.

However, the other image on which the obstacle marker 83 is superimposed may be an image other than the selection image of the parking mode. The autonomous parking control unit 55 may display the obstacle marker 83 at a predetermined position in the top view image 71 (the target parking position 76) or may display the obstacle marker 83 in a predetermined positional relationship with respect to the target parking position 76 (a center of the top view image 71).

Although the embodiment of the present disclosure has been described above, the present disclosure is not limited to the above embodiment, and modifications, improvements, and the like can be made as appropriate.

For example, in the above embodiment, the calculation unit 52 of the vehicle 10 has been described as the control device, but the present disclosure is not limited thereto. For example, the control device may be an information terminal such as a smartphone or a tablet terminal.

In the above embodiment, the parking position of the vehicle 10, and the feature points of the parking position and the periphery have been described using the top view image captured by the front camera 12Fr, the rear camera 12Rr, the left side camera 12L, and the right side camera 12R, but the present disclosure is not limited thereto. For example, an image captured by any one of the front camera 12Fr, the rear camera 12Rr, the left side camera 12L, and the right side camera 12R may be used.

In the above embodiment, a case where the autonomous parking control unit 55 displays the top view image 71 or the like on the touch panel 42 of the vehicle 10 has been described, but the present disclosure is not limited thereto. For example, the autonomous parking control unit 55 may display the top view image 71 or the like on a display screen of an information terminal (for example, a smartphone) carried by the occupant of the vehicle 10 via the communication unit 24.

The control method described in the above embodiment can be implemented by executing a control program prepared in advance on a computer. The control program is recorded in a computer-readable storage medium and is executed by being read from the storage medium. The control program may be provided in a form of being stored in a non-transitory storage medium such as a flash memory, or may be provided via a network such as the Internet. The computer that executes the control program may be provided in a control device, may be provided in an electronic device such as a smartphone, a tablet terminal, or a personal computer capable of communicating with the control device, or may be provided in a server device capable of communicating with the control device and the electronic device.

At least the following matters are described in the present specification. Although corresponding constituent elements and the like in the above embodiment are shown in parentheses, the present disclosure is not limited thereto.

(1) A control device (the calculation unit 52) for a moving body (the vehicle 10), the control device including:

- a receiver (the reception unit 56) configured to receive designation of an obstacle position from a user of the moving body; and
- a controller (the autonomous parking control unit 55) configured to perform parking control for parking the moving body at a target parking position (the target parking position 76) based on an obstacle position designated by the user, in which
- the controller is configured to register the obstacle position as a designated obstacle position in association with the target parking position.

According to (1), it is not necessary to designate the obstacle position each time when a vehicle is parked at the same parking position, and thus it is possible to reduce a burden on the user.

(2) The control device according to (1), in which

- in the parking control to the target parking position registered in association with the designated obstacle position, the controller is configured to perform control to park the moving body at the target parking position based on the designated obstacle position.

According to (2), it is not necessary to designate the obstacle position each time when the vehicle is parked at the same parking position, and thus it is possible to reduce the burden on the user.

(3) The control device according to (1) or (2), in which

- the controller is configured to inquire of the user whether the registration is necessary, and perform the registration according to a response from the user.

According to (3), it is possible to select whether to register according to whether a parking position is temporarily used, and it is possible to prevent unnecessary registration.

(4) The control device according to (3), in which

- the controller is configured to perform the registration according to a parking history of the moving body at the target parking position without performing the inquiry.

According to (4), it is possible to reduce inquiries to the user and responses from the user, and to reduce the burden on the user.

(5) The control device according to (3) or (4), in which

- the controller does not perform the inquiry when the target parking position and the obstacle position are registered in association with each other.

According to (5), it is possible to reduce unnecessary inquiries to the user and unnecessary responses from the user, and to reduce the burden on the user.

(6) The control device according to any one of (1) to (5), in which

- the controller is configured to perform a notification prompting the user to change the obstacle position according to a calculation result of a movement path of the moving body to the target parking position based on the obstacle position.

According to (6), it is possible to increase an execution frequency of the parking control.

(7) The control device according to any one of (1) to (6), in which the receiver is configured to notify the user of candidates for the obstacle position, and receive designation of the obstacle position selected by the user from the candidates for the obstacle position.

According to (7), a designation operation for the obstacle position is made easy, and a burden at the time of setting the obstacle position can be reduced.

(8) The control device according to (7), in which the receiver is configured to notify, in different modes, the user of a candidate selected by the user and a candidate not selected by the user among the candidates for the obstacle position.

According to (8), visibility for the user can be improved, and the burden and an erroneous operation at the time of setting the obstacle position can be prevented.

(9) The control device according to any one of (1) to (8), further including:

a display unit (the touch panel 42) configured to display a peripheral image (the top view image 71) of the moving body, in which the display unit is configured to perform a display with reference to a center point (the center point 76*a*) of the target parking position, when the designation of the obstacle position is received, or when the target parking position is determined, According to (9), when the designation of the obstacle position is received, a top view image with reference to the center point of the target parking position is displayed, and thus it is possible to prevent difficulty in the designation of the obstacle position.

(10) The control device according to (9), in which the display unit is configured to perform:

before the target parking position is determined, a first display with reference to a center point (the center point 10*a*) of the moving body; and after the target parking position is determined, a second display with reference to the center point of the target parking position.

According to (10), it is possible to display a top view image with reference to the center point of the moving body before the target parking position is determined, so as to intuitively grasp a state of a periphery of the moving body, and it is possible to prevent the difficulty in the designation of the obstacle position w % ben the designation of the obstacle position is received.

(11) The control device according to (9) or (10), in which the display unit is configured to display, on a selection image of a parking mode different from the peripheral image, an icon for receiving the designation of the obstacle position from the user.

According to (11), it is possible to prevent the difficulty in the designation of the obstacle position.

(12) A control method executed by a control device for a moving body, including:

receiving designation of an obstacle position from a user of the moving body;

performing parking control for parking the moving body at a target parking position based on an obstacle position designated by the user; and registering the obstacle position as a designated obstacle position in association with the target parking position.

According to (12), it is not necessary to designate the obstacle position each time when a vehicle is parked at the same parking position, and thus it is possible to reduce a burden on the user.

(13) A non-transitory computer-readable recording medium storing a control program for causing a processor of a control device for a moving body to execute processing, the processing including:

receiving designation of an obstacle position from a user of the moving body;

performing parking control for parking the moving body at a target parking position based on an obstacle position designated by the user; and registering the obstacle position as a designated obstacle position in association with the target parking position.

According to (13), it is not necessary to designate the obstacle position each time when a vehicle is parked at the same parking position, and thus it is possible to reduce a burden on the user.

The invention claimed is:

1. A control device for a moving body, the control device comprising:

a receiver configured to receive designation of an obstacle position from a user of the moving body; and a controller configured to perform parking control for parking the moving body at a target parking position based on an obstacle position designated by the user, wherein the controller is configured to register the obstacle position as a designated obstacle position in association with the target parking position, and the controller is configured to inquire of the user whether the registration is necessary, and perform the registration according to a response from the user.

2. The control device according to claim 1, wherein in the parking control to the target parking position registered in association with the designated obstacle position, the controller is configured to perform control to park the moving body at the target parking position based on the designated obstacle position.

3. The control device according to claim 1, wherein the controller is configured to perform the registration according to a parking history of the moving body at the target parking position without performing the inquiry.

4. The control device according to claim 1, wherein the controller does not perform the inquiry when the target parking position and the obstacle position are registered in association with each other.

5. The control device according to claim 1, wherein the controller is configured to perform a notification prompting the user to change the obstacle position according to a calculation result of a movement path of the moving body to the target parking position based on the obstacle position.

6. The control device according to claim 1, wherein the receiver is configured to notify the user of candidates for the obstacle position, and receive designation of the obstacle position selected by the user from the candidates for the obstacle position.

7. The control device according to claim 6, wherein the receiver is configured to notify, in different modes, the user of a candidate selected by the user and a candidate not selected by the user among the candidates for the obstacle position.

8. The control device according to claim 1, further comprising:

a display unit configured to display a peripheral image of the moving body, wherein the display unit is configured to perform a display with reference to a center point of the target parking position, when the designation of the obstacle position is received, or when the target parking position is determined.

9. The control device according to claim 8, wherein the display unit is configured to perform:

before the target parking position is determined, a first display with reference to a center point of the moving body; and after the target parking position is determined, a second display with reference to the center point of the target parking position.

10. The control device according to claim 8, wherein the display unit is configured to display, on a selection image of a parking mode different from the peripheral image, an icon for receiving the designation of the obstacle position from the user.

11. A control method executed by a control device for a moving body, comprising:

receiving designation of an obstacle position from a user of the moving body;

performing parking control for parking the moving body at a target parking position based on an obstacle position designated by the user;

registering the obstacle position as a designated obstacle position in association with the target parking position; and inquiring of the user whether the registration is necessary, and performing the registration according to a response from the user.

12. A non-transitory computer-readable recording medium storing a control program for causing a processor of a control device for a moving body to execute processing, the processing comprising:

receiving designation of an obstacle position from a user of the moving body;

performing parking control for parking the moving body at a target parking position based on an obstacle position designated by the user;

registering the obstacle position as a designated obstacle position in association with the target parking position; and inquiring of the user whether the registration is necessary, and performing the registration according to a response from the user.

13. A control device for a moving body, the control device comprising:

a receiver configured to receive designation of an obstacle position from a user of the moving body; and a controller configured to perform parking control for parking the moving body at a target parking position based on an obstacle position designated by the user, wherein the controller is configured to register the obstacle position as a designated obstacle position in association with the target parking position, and the controller is configured to perform a notification prompting the user to change the obstacle position according to a calculation result of a movement path of the moving body to the target parking position based on the obstacle position.

14. A control device for a moving body, the control device comprising:

a receiver configured to receive designation of an obstacle position from a user of the moving body; and a controller configured to perform parking control for parking the moving body at a target parking position based on an obstacle position designated by the user, wherein the controller is configured to register the obstacle position as a designated obstacle position in association with the target parking position, and the receiver is configured to notify the user of candidates for the obstacle position, and receive designation of the obstacle position selected by the user from the candidates for the obstacle position.

* * * * *